United States Patent
Oba et al.

(10) Patent No.: US 6,176,807 B1
(45) Date of Patent: Jan. 23, 2001

(54) DRIVE CONTROL SYSTEM FOR HYBRID VEHICLES

(75) Inventors: Hidehiro Oba, Aichi-ken; Kazumi Hoshiya, Gotenba; Hiroatsu Endo; Hisanori Nomoto, both of Susono, all of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/215,523

(22) Filed: Dec. 18, 1998

(30) Foreign Application Priority Data

Jan. 16, 1998 (JP) .................................................. 10-020495

(51) Int. Cl.$^7$ .............................. B60K 41/02; B60K 1/00
(52) U.S. Cl. ............................................... 477/5; 180/65.2
(58) Field of Search ............................... 477/5, 175, 181; 180/65.2

(56) References Cited

U.S. PATENT DOCUMENTS

| 5,059,059 | * | 10/1991 | Schmidt-Brucken | ............... 180/65.3 |
| 5,327,992 | * | 7/1994 | Boll | ..................................... 180/65.2 |
| 5,735,770 | * | 4/1998 | Omote et al. | ............................. 477/5 |
| 5,842,534 | * | 12/1998 | Frank | ................................... 180/65.2 |
| 6,003,626 | * | 12/1999 | Ibaraki et al. | ....................... 180/65.2 |
| 6,018,198 | * | 1/2000 | Tsuzuki et al. | ................. 180/65.2 X |
| 6,077,186 | * | 6/2000 | Kojima et al. | ........................ 477/5 X |

FOREIGN PATENT DOCUMENTS

| 9-37411 | 2/1997 | (JP) . |
| 9-193676 | 7/1997 | (JP) . |

* cited by examiner

Primary Examiner—Charles A Marmor
Assistant Examiner—Roger Pang
(74) Attorney, Agent, or Firm—Oliff & Berridge, PLC

(57) ABSTRACT

A drive control system for a hybrid vehicle in which an internal combustion engine is selectively coupled through a clutch mechanism to a power transmission line coupled to an electric motor. The drive control system comprises: motoring device for coupling the engine to the power transmission line to rotate the engine, with the feed of a fuel to the engine being stopped when the hybrid vehicle is driven to run by the output of the electric motor, by controlling the clutch mechanism in an applied state. Thus, it is possible to start the engine even at a low speed of the hybrid vehicle and to prevent the deterioration in the riding comfort, as might otherwise be caused by the fluctuation in a driving torque.

4 Claims, 16 Drawing Sheets

FIG.7

| RUNNING MODE | CLUTCH | |
|---|---|---|
| | Ci | Cd |
| MOTOR RUNNING MODE | △ | ○ |
| ENGINE RUNNING MODE | ○ | ○ |
| ASSIST MODE | ○ | X |
| NEUTRAL MODE | X | X |

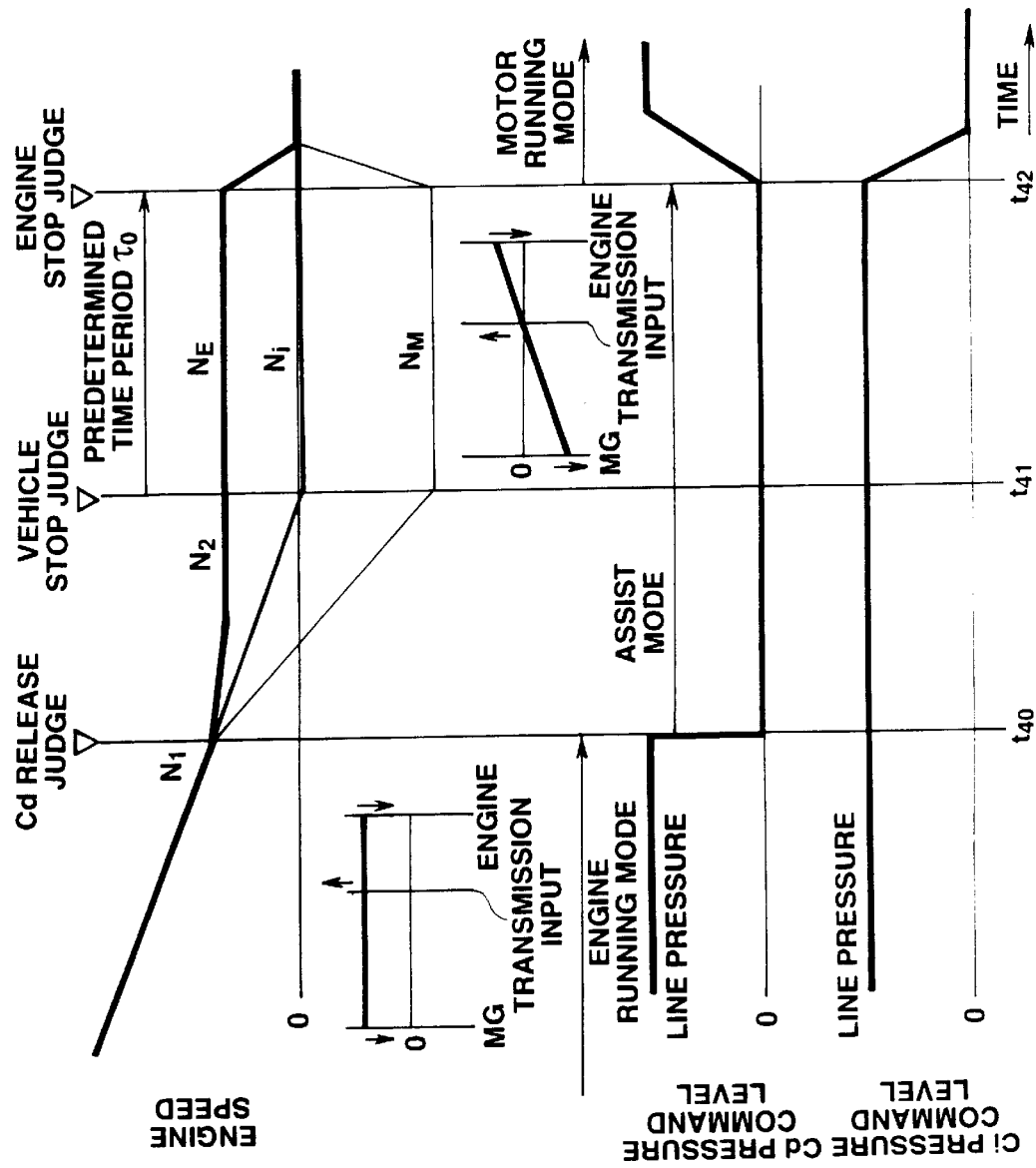

DRIVE CONTROL SYSTEM FOR HYBRID VEHICLES

BACKGROUND OF THE INVENTION

1. Field of the Invention

The present invention relates to a system for controlling a driving force in a hybrid vehicle which is equipped as its motive force source with an internal combustion engine such as a gasoline engine or a Diesel engine and an electric motor such as a motor or a motor/generator to be activated by an electric power for outputting a torque.

2. Related Art

As well known in the art, the internal combustion engine inevitably emits exhaust gases. The components and amounts of the exhaust gases are dependent upon the running state of the internal combustion engine. At a high load running time when the throttle opening is increased at a low vehicle speed, according to a general tendency, it is liable to lower the cleanness of the exhaust gases and the fuel economy. In recent years, on the other hand, a demand for the cleanness of the exhaust gases of the vehicle having the internal combustion engine mounted thereon has grown higher and higher. In order to satisfy this demand, there has been developed a hybrid vehicle which is equipped with the internal combustion engine and an electric motor as its motive force source. In the hybrid vehicle of this kind, the motive force source can be selected according to the running state or the demanding state of the driving force so that the internal combustion engine can be run in the most efficient state. As a result, the fuel economy can be improved better than the prior art, and the emission of the so-called "greenhouse gases" can be reduced.

On the other hand, there is known as the type of the hybrid vehicle the so-called "parallel hybrid", in which an electric motor and a power generator are coupled to a power transmission line such as a transmission or a drive shaft and in which the internal combustion engine is selectively coupled to the power transmission line by a coupling mechanism such as a clutch so that the output of the internal combustion engine may be used as the motive powers for generating the electric power and for driving the hybrid vehicle. At a low vehicle speed time when the internal combustion engine drops its working efficiency or comes into an unstable running state, this parallel hybrid vehicle is driven to run by the electric motor, and the internal combustion engine is started when the vehicle speed rises to some level. In this case, the torque of the electric motor can be transmitted to the internal combustion engine through application means such as the clutch so that the internal combustion engine can be rotated and started if the application means is applied while the vehicle is driven to run by the electric motor. With this construction, the starter, as has been employed in the general vehicle of the prior art, can be done away with to reduce the size and weight of the drive unit.

When the internal combustion engine is not started before the vehicle speed rises to some extent, as described above, the coupling mechanism can be released at a low vehicle speed time or at a starting time to uncouple the internal combustion engine from the power transmission line so that the internal combustion engine can be left at a stop. A system for this control has been disclosed in Japanese Patent Laid-Open No. 37411/1997. According to this system, the output of the electric motor is not wasted even partially by the friction, as accompanying the mere rotation of the internal combustion engine, so that the power loss can be prevented to improve the energy efficiency.

Here, the internal combustion engine such as a gasoline engine or a Diesel engine can be fed with a fuel and ignited even in a state having a speed lower than the idle level. In this state of a low speed, however, the combustion is not stabilized to make the output torque or output rotation unstable. In the system, as disclosed in the aforementioned Laid-Open, the internal combustion engine is uncoupled at a low vehicle speed time from the power transmission line and is left at a stop. In addition to the aforementioned prevention of the power loss, therefore, it is possible to prevent the fluctuation in the driving torque and the resultant deterioration in the riding comfort.

However, the system of the prior art thus far described is constructed such that the internal combustion engine is completely stopped at the low vehicle speed time. When the vehicle is to be accelerated from the low speed running state, therefore, the vehicle is driven by the output of the electric motor till the speed of the electric motor rises to the level corresponding to the idle speed of the internal combustion engine, and the internal combustion engine is then coupled to the power transmission line and fed with the fuel so that it may be started. This makes it impossible for the internal combustion engine to output a high torque before the speed of the electric motor rises to the level corresponding to the idle speed of the internal combustion engine. As a result, it takes a long time to generate a driving force sufficient for a demand for an acceleration after the driver does an operation for the acceleration. This raises a disadvantage that the vehicle is deficient in a responsibility to the acceleration.

When the vehicle is to be started with a high running resistance as on a steep uphill, on the other hand, the vehicle speed cannot be raised if the output torque of the electric motor is relatively short. Since the internal combustion engine cannot be started in this case, the drive by the electric motor has to be continued but may be unable to satisfy the demand for the acceleration or may lower the charging amount of a battery abnormally.

According to the system of the prior art, moreover, when the vehicle is decelerated for a temporary stop, the internal combustion engine is uncoupled from the power transmission line to make the stop. When the vehicle is accelerated again after the temporary stop, however, the internal combustion engine cannot be started till the speed of the electric motor reaches the level corresponding to the idle speed of the internal combustion engine. This causes disadvantages that the vehicle is deficient in the acceleration and its responsibility.

SUMMARY OF THE INVENTION

An object of the invention is to provide a drive control system for starting an internal combustion engine easily even at a low vehicle speed time just after the start of a hybrid vehicle which is equipped with the internal combustion engine and an electric motor as its motive force source.

Another object of the invention is to prevent the shock which might otherwise be caused at the time of starting the internal combustion engine or coupling the started internal combustion engine to the power transmission line.

According to the invention, therefore, there is provided motoring means for coupling the internal combustion engine to the power transmission line to rotate the internal combustion engine, with the feed of a fuel to the internal combustion engine being stopped when the hybrid vehicle is driven to run by the output of the electric motor, by controlling a clutch mechanism in an applied state. As a result, the internal combustion engine is dragged, as it is called so, while the vehicle is driven to run by the output of the electric motor. When the internal combustion engine has to be started in response to a demand for raising the driving force or for generating the electric power, therefore, it can be instantly started by feeding it with the fuel. As a result, a delay in the response to such demand can be avoided.

In the invention, moreover, the internal combustion engine and the power transmission line can be uncoupled by controlling the clutch mechanism in a released state when the vehicle speed or the input speed of a transmission is at a predetermined or higher level or when the gear ratio is at a medium or low level below a predetermined level when the hybrid vehicle is driven to run by the output of the electric motor. With this construction, while the vehicle is driven to run by the output of the electric motor, on the other hand, the internal combustion engine is rotated by coupling it to the power transmission line only either when the vehicle speed or the input speed of the transmission is low or when the gear ratio is high. By starting the feed of the fuel to the internal combustion engine while the vehicle is running with the electric motor, the internal combustion engine can be started so that the shock to be caused by the start of the internal combustion engine can be easily reduced. Since the speed of the internal combustion engine having no feed of the fuel is low, moreover, the power loss can be suppressed. In the running state contrary to this, that is, while the vehicle is running with the power of the electric motor and when the vehicle speed or the input speed of the transmission is high or when the gear ratio is low, the internal combustion engine is uncoupled from the power transmission line and is stopped so that the power loss, as might otherwise accompany the rotation of the internal combustion engine, will not occur. Even when the internal combustion engine is rotated to be started, moreover, the change in the driving torque can be reduced to prevent the deterioration in the shock.

In the invention, moreover, while being rotated by the output of the electric motor, the speed of the internal combustion engine can be limited to a predetermined level.

With this construction, the speed of the internal combustion engine having no feed of the fuel can be restricted to a low level so that the power loss due to the friction in the internal combustion engine or the compression of the air can be suppressed. If the speed of the internal combustion engine is restricted by restricting the torque transmission capacity of a coupling mechanism, moreover, the torque fluctuation accompanying the rotation of the internal combustion engine can be suppressed from appearing in the driving torque.

When the vehicle is to be started by the output of the electric motor, according to the invention, the internal combustion engine is coupled to the power transmission line by the clutch mechanism so that it may be rotated, and the internal combustion engine can be started by feeding it with the fuel at a predetermined speed and then uncoupled from the power transmission line. With this construction, since the internal combustion engine is rotated by the torque of the electric motor from the start by the output of the electric motor, it can be started by feeding it with the fuel even when the speed of the electric motor or the vehicle speed is low. If the combustion in the internal combustion engine is continuous, on the other hand, the internal combustion engine is uncoupled from the power transmission line. As a result, even if the combustion or the output torque is unstable because the speed of the internal combustion engine is low, it is possible to prevent the fluctuation in the driving torque.

Here in the invention, the internal combustion engine can be rotated and started by the motive power of the electric motor after it was started by the output of the electric motor, and then can be uncoupled from the power transmission line. With this construction, the time period for driving the internal combustion engine with the electric motor is shortened to suppress the power loss which might otherwise be caused by rotating the internal combustion engine with no feed of the fuel.

The system of the invention can be also constructed such that the time point when the combustion of the fuel is started by igniting the internal combustion engine, i.e., when the internal combustion engine is substantially started can be decided on the basis of the speed of the internal combustion engine to be driven by the electric motor. With this construction, too, it can be easily started at the low speed of the vehicle or the electric motor, and the fluctuation in the output torque of the internal combustion engine in the case where the engine is started at the low speed does not appear in the driving torque so that the deterioration in the riding comfort can be prevented.

In the invention, moreover, there can be further provided application control means for applying again the released clutch mechanism so that the speed of the internal combustion engine may reach a predetermined level. With this construction, the speeds of the electric motor and the internal combustion engine are synchronized at the time point when the clutch mechanism is applied, so that the run of the vehicle can be changed from that by the electric motor to either that by the internal combustion engine or that by the electric motor and the internal combustion engine.

On the other hand, the invention can be provided with a mechanism for coupling the internal combustion engine to the power transmission line through a torque synthesizing/distributing mechanism capable of performing a differential action and for integrating the torque synthesizing/distributing mechanism. Since the transmission of the torque between the internal combustion engine and the power transmission line can be controlled by the torque synthesizing/distributing mechanism, the internal combustion engine can be started as in the foregoing individual constructions even at a starting time or at a low vehicle speed time by the electric motor, and the power loss, as might otherwise be caused by rotating the internal combustion engine unnecessarily by the electric motor, can be reduced. Since the torque synthesizing/distributing mechanism performs the differential action, moreover, the speed of the internal combustion engine can be controlled even while the vehicle is at a stop. This makes it possible to start and accelerate the vehicle easily from the stop time.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 7 is a table enumerating the running modes to be set in the drive mechanism shown in FIG. 6;

FIG. 16 is a flow chart showing one example of the control routine for controlling the engine speed to a predetermined value by the motor generator when an engine stopped.

DETAILED DESCRIPTION OF THE PREFERRED EMBODIMENTS

The invention will be described in more detail with reference to the accompanying drawings. The invention relates to a drive control system for a hybrid vehicle employing an electric motor and an internal combustion engine as its motive force sources. Here, the internal combustion engine is, in short, a motive force source for outputting a power by burning a fuel, as specified by a gasoline engine, a Diesel engine or a gas engine using a gaseous fuel such as a hydrogen gas and as classified into not only a reciprocating engine but also a turbine engine. Moreover, the internal combustion engine will be abbreviated into the "engine".

On the other hand, the electric motor is in short a motive force source to be electrically activated to output a power, as specified by a variety of motors such as a stationary magnet type synchronous motor or a DC motor and further by a motor/generator to be driven by an external power to generate an electric power. Moreover, the electric motor can be used with a power generator. Here, the electric motor will be exemplified by the motor/generator.

The hybrid vehicle, to which the invention is applied, is of the type in which the engine is rotated by the output of the motor and started by feeding it with the fuel when its speed reaches a predetermined level. In short, the hybrid vehicle is of the so-called "parallel type" in which the engine and motor are connected together to a power transmission line for the run so that it can run with the individual outputs of the engine and the motor.

The power transmission line is in short a mechanism for transmitting the driving force to drive wheels, and may or may not be provided with a transmission. With the transmission, the power transmission line can control the driving force. Moreover, the transmission can be exemplified either by a manual transmission for changing the gear ratio manually or by an automatic transmission for changing the gear ratio in accordance with the running state such as the vehicle speed and the engine load. The transmission can be exemplified not only by a stepped one for changing the gear ratio stepwise but also by a continuously variable one for changing the gear ratio continuously. There will be described an example of the drive control system using the automatic transmission hereinafter.

In this power transmission line, moreover, there can be employed a mechanism such as a planetary gear mechanism which is given a differential action by combining three rotary elements. By connecting the motor to any rotary element and the engine to another rotary element, the output of the motor and the output of the engine can be synthesized and outputted, and the output of the engine can be outputted to drive the vehicle on one hand and to drive the motor on the other hand for the power generation. Thus, the mechanism for performing the differential action can function as one for synthesizing and distributing the torque.

Figure 1:
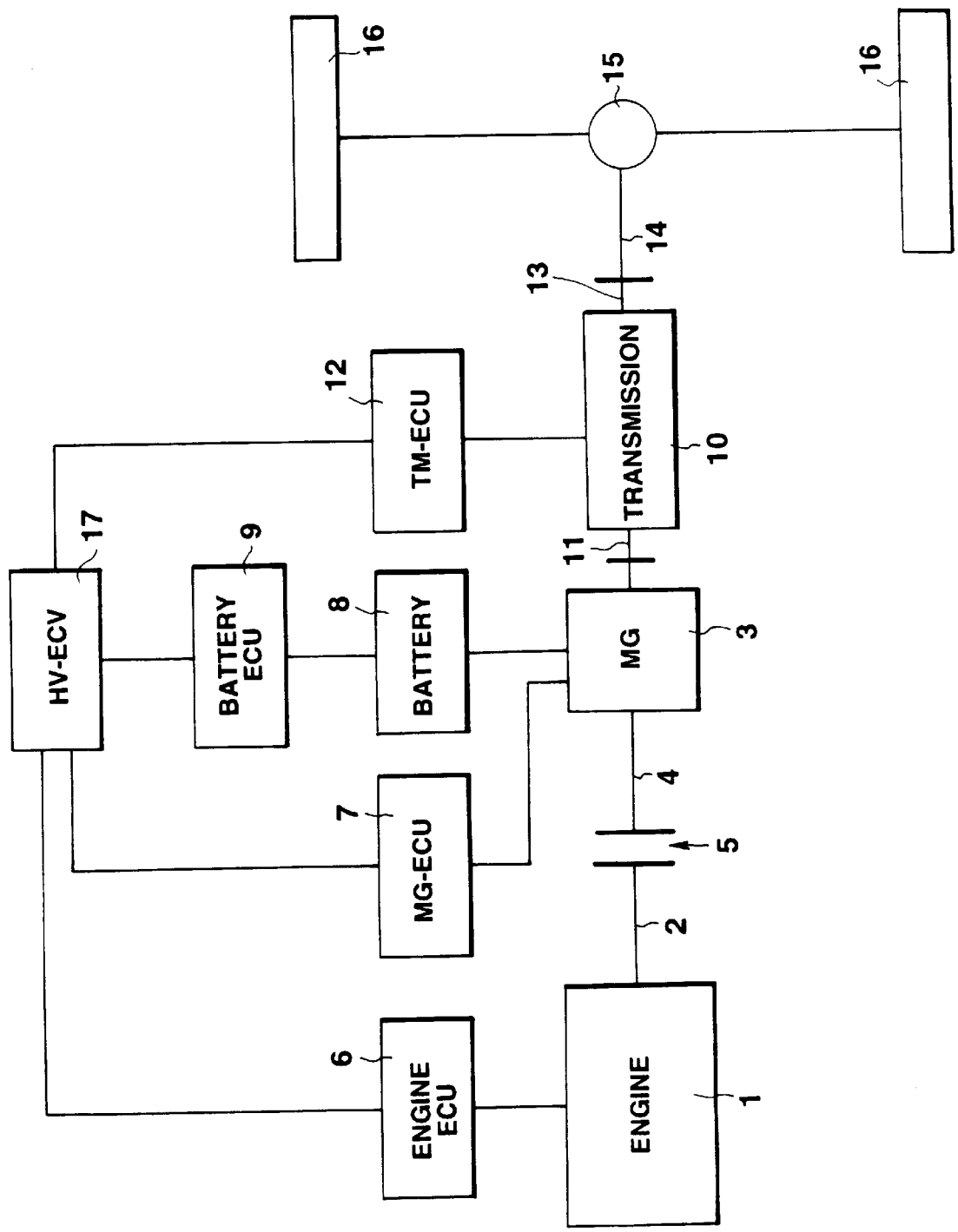
FIG. 1 is a schematic diagram showing the entire construction of one example of a hybrid vehicle, to which the invention is applied.

FIG. 1 is a schematic block diagram showing a drive control system according to the invention. An engine 1 is connected at its output shaft (or crankshaft) 2 to a rotary shaft 4 of a motor/generator (MG) 3 through an input clutch 5. This input clutch 5 corresponds to a clutch mechanism in the invention. More specifically, the input clutch 5 can be exemplified by a friction clutch of the type, in which friction discs are brought into contact with each other by an oil pressure to acquire a torque transmission capacity which increases with a fed oil pressure, and further by a wet-type multiple disc clutch. There is provided a (not-shown) control unit for electrically controlling the oil pressure to be fed to the input clutch 5 and the application/release of the oil pressure.

The engine 1 of FIG. 1 is of the type, in which the ignition timing, the fuel feed rate (or fuel injection rate), the idle speed, the valve timing, the throttle opening and so on are electrically controlled, and is provided with an electronic control unit (or engine ECU) 6 for those controls. This electronic control unit 6 is a device constructed mainly of a microcomputer and is constructed to receive data including the intake air rate, the accelerator position, the engine water temperature and the engine speed NE thereby to determine and output the controlled variables such as the ignition timing or the throttle opening on the basis of the data stored in advance and the data inputted as programs.

The motor/generator 3 is provided with a well-known structure, in which a rotor integrated with the rotary shaft 4 is rotatably arranged at the inner side of a stator having a coil and which is equipped with a resolver for detecting the rotation of the rotor. The motor/generator 3 is constructed such that the rotor is rotated forward/backward while controlling the torque by controlling the electricity of the coil, and such that an electromotive force is generated by turning the rotor with an external force. In order to control the motor/generator 3, there is provided an electronic control unit (MG-ECU) 7 which is constructed mainly of a microcomputer. To this electronic control unit 7, there are inputted the control data such as the speed NM of the motor/generator 3, i.e., the motor speed.

There is further provided a battery 8 for feeding an electric current to the motor/generator 3 and for reserving the electric power generated in the motor/generator 3. In order to control the charge/discharge of the battery 8, there is provided an electronic control unit (or battery ECU) 9 which is constructed mainly of a microcomputer.

To the rotary shaft 4 of the motor/generator 3 thus constructed, there is connected an input shaft 11 of a transmission 10. As this transmission 10, there is adopted in the example of FIG. 1 an electronic control type automatic transmission in which the gear ratio is controlled on the basis of a running state. Specifically, the transmission 10 is constructed to determine the gear ratio on the basis of the data such as the throttle opening, the vehicle speed, the shift pattern or the shift range and to control a (not-shown) frictional engagement device such as the clutch or the brake by the oil pressure thereby to establish the gear ratio. For this control, there is provided an electronic control unit (TM-ECU) 12.

Moreover, an output shaft 13 of the transmission 10 is connected through a propeller shaft 14 and a final reduction gear 15 to drive wheels 16. Therefore, the transmission line from the rotary shaft 4 of the motor/generator 3 through the transmission 10 to the drive wheels 16 corresponds to the power transmission line of the invention.

The individual electronic control units 6, 7, 9 and 12 are so connected with a hybrid control unit (HV-ECU) 17 constructed mainly of a microcomputer as to communicate with each other through the data. This hybrid control unit 17 is constructed to synthetically control the application/release and the torque transmission capacity of the input clutch 5, the timing and rate of the fuel feed to the engine 1, the drive/regeneration and the output torque of the motor/generator 3, and the gear ratio by the transmission 10, thereby to control the driving force of the hybrid vehicle. Specifically, the hybrid control unit 17 is provided with programs for inputting/outputting and processing the data, as necessary for those controls.

The hybrid vehicle has been developed with a main view of improving the fuel economy and cleaning the exhaust gases. Therefore, the hybrid vehicle selects the motive force sources in response to the running state such that it runs with the output of the motor at a low vehicle speed, with the output of the engine, when it cruises at a constant speed which is higher than a predetermined level, and with the outputs of the engine and the motor when a higher driving force is demanded. When the (not-shown) accelerator pedal is deeply depressed at the starting time to demand a high driving force, the engine 1 has to be started to increase the driving force even at a low vehicle speed or at a low motor speed.

Figure 2:
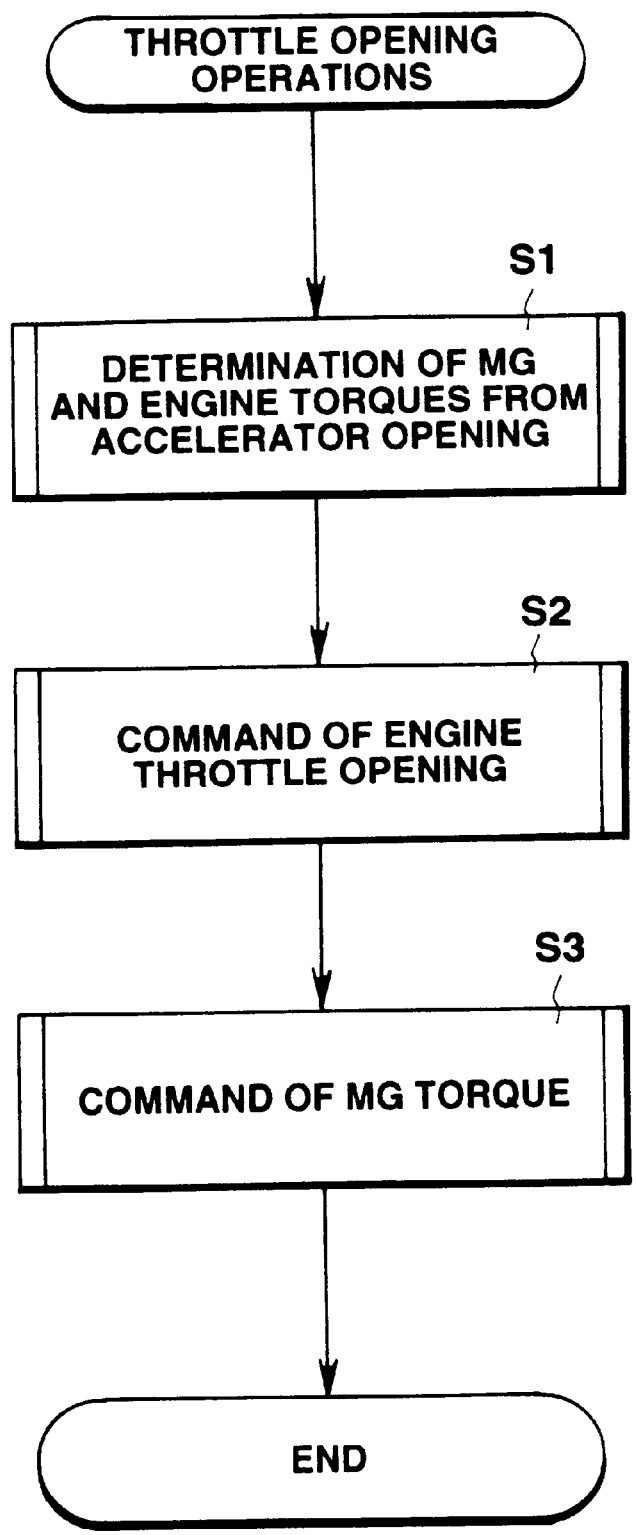
FIG. 2 is a schematic flow chart for explaining a throttle opening command control and a motor torque command control to be executed in a drive control system of the invention.

Here will be described examples of the control to be executed in the drive control system of the invention. First of all, FIG. 2 shows an operation routine of the throttle opening and the torque (or MG torque) of the motor/generator 3 when the accelerator pedal is deeply depressed at the starting time. Specifically, the torque of the motor/generator 3 and the torque to be generated in the engine 1 are calculated (at Step S1) on the basis of the accelerator opening (i.e., the depression angle of the accelerator pedal). This calculation can be performed, for example, by reading the torque value which has been stored in advance in the form of a map corresponding to the accelerator opening.

Next, a command signal is outputted (at Step S2) to set the throttle opening necessary for outputting the engine torque determined at Step S1. Moreover, a command signal is outputted (at Step S3) to the motor/generator 3 so that the motor/generator 3 may output the torque determined at Step S1.

Figure 3:
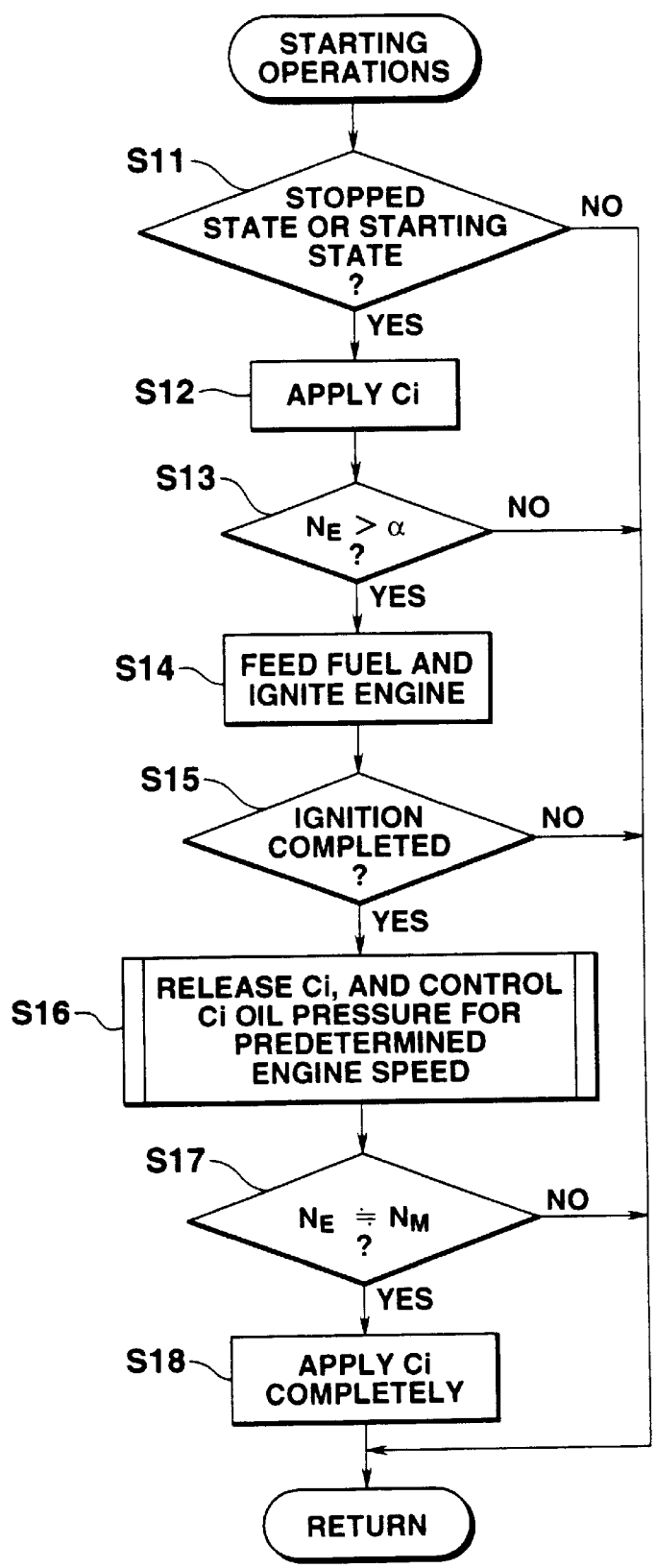
FIG. 3 is a flow chart for explaining one example of an engine start control routine after a motor starts, as executed in the drive control system of the invention.

On the other hand, a start of the vehicle to be effected by operating the accelerator pedal and a start of the engine 1 for outputting a demanded driving torque are controlled, as shown in FIG. 3. First of all, it is decided (at Step S11) whether or not the vehicle is in a stopped state or in a starting state. This decision can be made on the basis of the ON/OFF signal or the vehicle speed signal of a (not-shown) start switch. In this case, moreover, the input clutch 5 is released, and the engine 1 is stopped.

When the answer of Step S11 is NO, this routine is skipped out without any control When the answer of Step S11 is YES, on the contrary, the input clutch 5 is applied (at Step S12). When the vehicle is to be started by the output of the motor/generator 3, more specifically, the input clutch 5 is applied to transmit the torque to the engine 1 from the motor/generator 3 to rotate the engine 1.

After the vehicle was thus started while dragging (or freely rotating) the engine 1, as it is called so, it is decided (at Step S13) whether or not the speed NE of the engine 1 is higher than a predetermined reference level $\alpha$. This reference speed $\alpha$ is generally lower than the idle speed at which the fuel is continuously burned in the engine 1, although unstably, by feeding the fuel to and igniting the engine 1, as qualitatively described, so that the engine 1 is enabled to continue its rotation by its own power.

When the answer of Step S13 is NO, therefore, the engine 1 is not in the state capable of igniting itself so that the routine is returned without any control. When the answer of Step S13 is YES, on the contrary, the engine 1 is fed with the fuel and ignited (at Step S14). After this, it is decided (at Step S15) whether or not the ignition of the engine 1 has been completed.

This decision of the ignition completion at Step S15 is, in short, to decide whether or not the substantial start of the engine 1, i.e., the combustion of the fuel is continued, and can be specifically made on the basis of either the output torque of the engine 1 or the elapsed time period from the start of the fuel feed or the ignition control at Step S14. Alternatively, the decision can be made on the basis of the change in a current value, as caused by the reduction in the load on the motor/generator 3 due to the start of the engine 1.

When the answer of Step S15 is NO, the routine is returned because the substantial start of the engine 1 is not completed. When the ignition completion extracts the answer YES from Step S15, on the contrary, the input clutch 5 is temporarily released, and its oil pressure is controlled (at Step S16) so that the engine speed NE may take the level which has been predetermined on the basis of the throttle opening and the accelerator opening. Specifically, the engine 1 is temporarily uncoupled from the power transmission line by releasing the input clutch 5 because the ignition of the engine 1 is made at such a low speed that the unstable combustion prevails in the engine 1 or that the output torque highly fluctuates. As a result, the fluctuation in the output torque, as caused by the instability of the combustion in the engine 1, will not be transmitted to the power transmission line thereby to prevent a fluctuation in the driving force and the resultant deterioration in the riding comfort of the vehicle.

On the other hand, after temporarily released, the input clutch 5 is applied again, and the torque transmission capacity is controlled by the oil pressure so that the engine speed NE may neither excessively rise nor drop, as might otherwise be invited by an excessively high load. This control of the force for applying the input clutch 5 can be executed by sweeping up the indicated oil pressure according to a predetermined gradient and then keeping it at a constant level. Specifically, the oil pressure of the input clutch 5 may be controlled with an output signal of a solenoid valve which has an output oil pressure changing with an electric signal (at a duty ratio or a current value). Another example of the control of the force for applying the input clutch 5 is a feedback control of the oil pressure of the input clutch 5. In this feedback control, the target level of the engine speed NE, as set by applying the input clutch 5 again, is exemplified by the idle level or the like so that the oil pressure of the input clutch 5 is controlled according to the deviation between the actually detected engine speed NE and the target level. As a result, the input clutch 5 is set in an intermediate state, i.e., a partially applied state between the completely applied and completely released states.

It is then decided (at Step S17) whether or not the engine speed NE and the motor speed NM are substantially equal. The routine is returned when the answer of Step S17 is NO, but the input clutch 5 is completely applied (at Step S18) when the answer is YES. When these two speeds NE and NM are synchronized, more specifically, the rotational change accompanying the complete connection of the engine 1 to the power transmission line will not abruptly occur so that the shock is prevented, and the output of the engine 1 is completely transmitted to the power transmission line so that a necessary and sufficient driving force can be established, as demanded for the run.

By the control shown in FIG. 2, therefore, the engine is started in the low speed state just after the start of the vehicle. As a result, the output of the engine 1 can be employed as the driving force as soon as a high driving force is demanded in the low speed state, so that the demand for the driving force can be satisfied quickly and fully. Although the engine 1 is thus started in the low speed state of the vehicle and in the low speed state of the motor/generator 3, the engine 1 is disconnected from the power transmission line while the engine 1 is unstable in combustion to have a high fluctuation in the engine torque. As a result, this engine torque fluctuation does not appear as the fluctuation in the driving torque so that the deterioration in the riding comfort of the vehicle can be prevented. According to the control shown in FIG. 2, therefore, the engine output can be utilized as the driving force even at a start of the vehicle on a steep uphill so that the acceleration on the steep uphill can be not merely performed, but an excessive discharge of the battery 8, as might otherwise be caused by a long run of the motor/generator 3, can be also prevented in advance.

Figure 4:
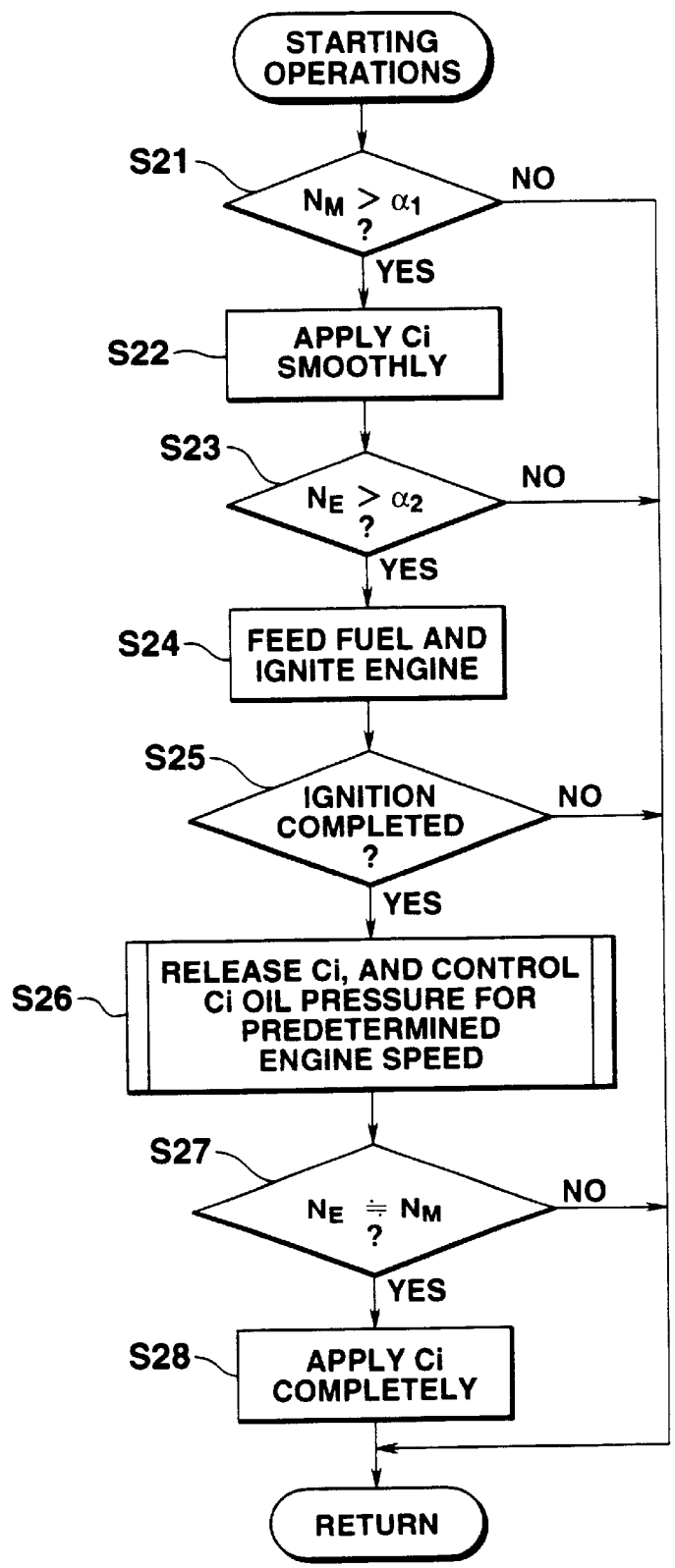
FIG. 4 is a flow chart for explaining another example of the engine start control routine after a motor starts, as executed in the drive control system of the invention.

Here, the drive control system of the invention is constructed to execute the control in which the engine 1 is started at a low vehicle speed or at a low motor speed just after the vehicle starts so that its output torque may be effectively utilized for accelerating the vehicle. Therefore, the start of the engine 1 may be executed at the low vehicle speed or at the low motor speed just after the vehicle starts. FIG. 4 shows an example of the control in which the engine 1 is rotated at first just before the ignition. When the control shown in FIG. 4 is to be executed, therefore, at the start of the vehicle, the input clutch 5 is released, and the engine 1 is stopped.

In FIG. 4, first of all, it is decided (at Step S21) whether or not the motor speed NM after the start of the vehicle is higher than a predetermined first reference speed $\alpha 1$. This reference speed $\alpha 1$ is about a minimum level or slightly lower than the minimum level, at which the engine 1 can be substantially started, as exemplified by about 100 rpm.

When the answer of this Step S21 is NO, the routine is returned without any control. When the answer of Step S21 is YES, on the contrary, the input clutch 5 is smoothly applied (at Step S22). As this input clutch 5, there can be adopted a friction clutch for transmitting the torque by the frictional force, so that the torque to be transmitted is smoothly raised by gradually raising the pressure for the friction disks to contact, i.e., the application force (in terms of the oil pressure). By executing the control of Step S22, therefore, the torque is gradually transmitted to the engine 1 so that the speed NE of the engine 1 rises. In this case, moreover, the portion of the motor torque which is to be used for rotating the engine 1 smoothly rises to smoothen the change in the driving torque so that the shock is avoided in advance.

Next, it is decided (at Step S23) whether or not the engine speed NE is higher than a predetermined second reference level $\alpha 2$. This second reference level $\alpha 2$ corresponds to the minimum speed, as exemplified by 200 to 300 rpm, at which the so-called "autonomous rotation" of the engine 1 is enabled to continue the combustion in the engine 1 by feeding the engine 1 with the fuel and igniting it. When the answer of this Step S23 is NO, the routine is returned because the answer means that the starting condition of the engine 1 is not prepared. When the answer of Step S23 is YES, on the contrary, the engine 1 is fed with the fuel and is ignited (at Step S24). The control of this Step S24 is similar to the aforementioned one of Step S14 of FIG. 3.

From now on: the decision of ignition completion (at Step S25) is executed as at Step S15; the temporary release of the input clutch 5 and the subsequent re-application of the input clutch 5 (at Step S26) for keeping the engine speed NE at the predetermined level based on the throttle opening and the accelerator opening are executed as Step S16; the decision on the synchronism (at Step S27) between the engine speed NE and the motor speed NM is executed as at Step S17; and the complete application (at Step S28) of the input clutch 5 is executed as at Step S18.

In the control shown in FIG. 4, more specifically, after the vehicle was started by the motor output, the engine 1 is disconnected from the power transmission line till the motor speed NM reaches the level capable of starting the engine 1 substantially. As a result, the engine 1 is not brought into the so-called "dragged state" just after the start of the vehicle, so that the wasteful consumption of the power is avoided to improve the fuel economy of the vehicle advantageously. Moreover, the engine 1 is started at the low speed allowing the so- called "autonomous rotation", although the combustion is unstable. Just after this, moreover, the input clutch 5 is temporarily released to allow the start of the engine 1 at the low vehicle speed, and the fluctuation in the engine torque does not appear in the driving torque so that the disadvantage such as the deterioration in the riding comfort can be avoided in advance. Moreover, the effect that the driving torque can be sufficiently increased even at a vehicle start on a steep uphill can be achieved as from the control shown in FIG. 3.

Figure 5:
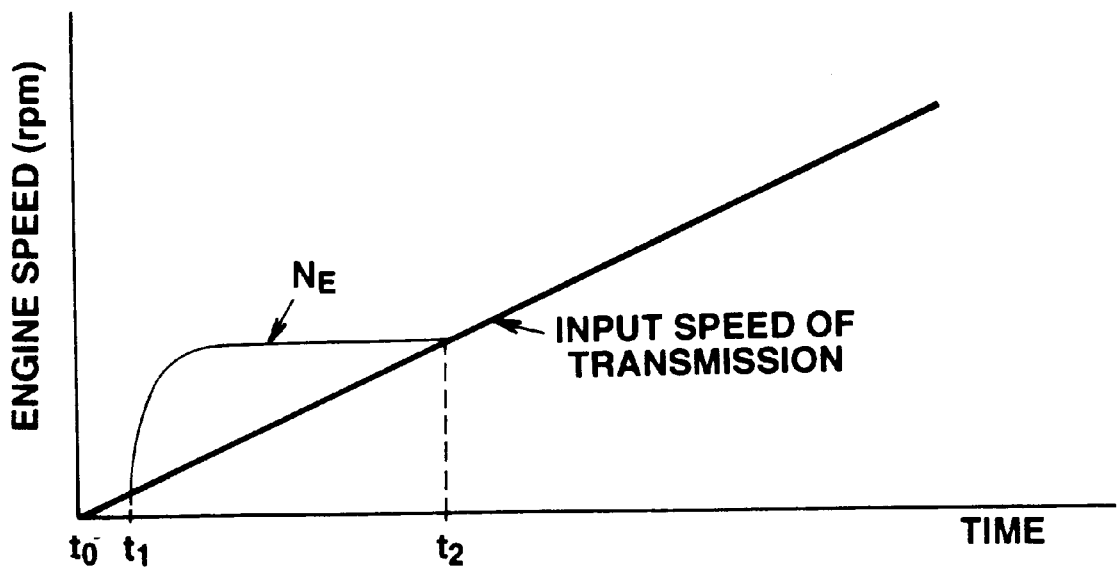
FIG. 5 is a time chart illustrating changes in the engine speed and the input speed of the transmission when the control shown in FIG. 3 or 4 is executed.

The changes in the engine speed NE and the input speed of the transmission 10 (i.e., the motor speed NM) in the case of the aforementioned controls are schematically illustrated in FIG. 5. In FIG. 5, the input speed of the transmission 10 begins to rise from a vehicle starting moment t0, and the input clutch 5 is released at a moment t1 just after the engine 1 is ignited when the motor speed reaches a predetermined level. In other words, the speed NE is increased when the engine 1 is disconnected from the power transmission line. Simultaneously with this, moreover, the input clutch 5 is applied again while its torque transmission being controlled, so that the engine speed NE is kept at a predetermined level such as the idle speed. For the time period, the motor speed, i.e., the input speed of the transmission 10 increases so that the engine speed NE and the input speed of the transmission 10 (i.e., the motor speed NM) are synchronized at a moment t2 to apply the input clutch 5 completely.

For the time period from the moment t1 at the ignition completion of the engine 1 to the moment t2 at the synchronization of the aforementioned individual speeds, therefore, the input clutch 5 is subjected to the so-called "slip control (in an incompletely applied state)" so that the engine torque is partially transmitted as the driving force to the power transmission line. At and after the synchronization moment t2, moreover, the engine torque is transmitted as it is through the power transmission line to establish the driving torque. As a result, the driving force can be sufficiently increased to satisfy the demand for the acceleration. Since the input clutch 5 is temporarily released just after the start of the engine 1, moreover, the fluctuation in the driving torque and the accompanying shock can be prevented. In the prior art, on the contrary, the control of starting the engine is not started before either the motor speed or the input speed of the transmission 10 rises as high as the idle speed. As a result, the driving force comes short at the low vehicle speed to fail to satisfy the demand for the acceleration, and the engine torque is not established till the input speed of the transmission 10 (or the motor speed) rises to the level of the idle speed, so that the acceleration control is prominently delayed. However, those disadvantages can be avoided in advance by the drive control system according to the invention.

Figure 6:
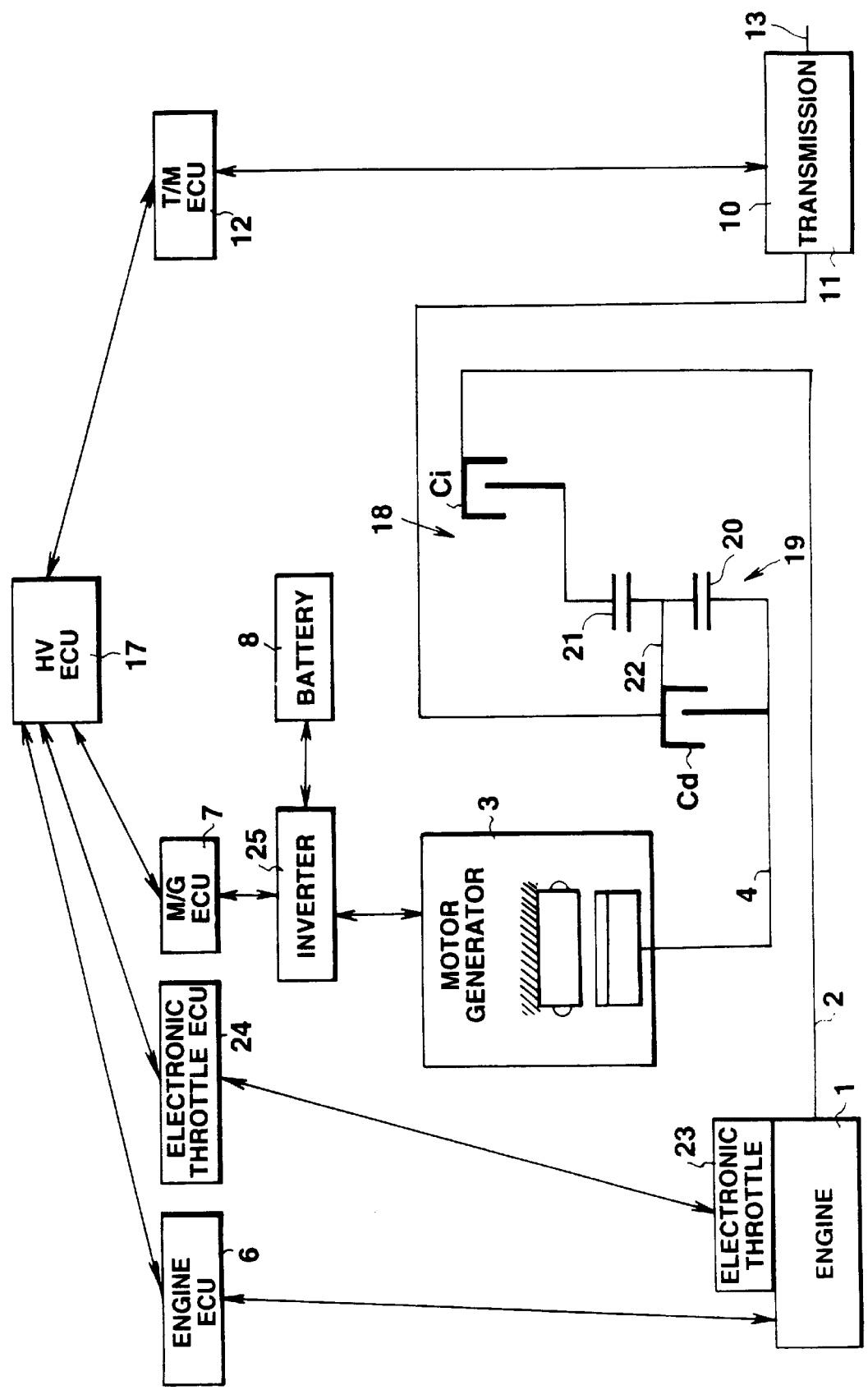
FIG. 6 is a schematic diagram showing a drive mechanism of the hybrid vehicle, to which the invention is applied.

Here, the drive control system of the invention is appled to the so-called "parallel hybrid type" vehicle or drive unit, and this parallel hybrid type should not be limited to that shown in FIG. 1. FIG. 6 shows one example of the hybrid drive unit in which the motor/generator and the engine are coupled to the power transmission line through a torque synthesizing/distributing mechanism. The drive control system of the invention can be applied to the parallel hybrid drive unit or hybrid vehicle of the type shown in FIG. 6.

First of all, here will be described the construction shown in FIG. 6. Reference numeral 18 designates a torque synthesizing/distributing mechanism as a whole, which is constructed mainly of a planetary gear mechanism 19 and two clutches Ci and Cd. A sun gear 20 or a first rotary element of the planetary gear mechanism 19 is connected to the rotary shaft 4 of the motor/generator 3. Between this sun gear 20 and a ring gear (corresponding to a second rotary element) 21 or an internal gear, as arranged concentrically with the sun gear 20, moreover, there are arranged pinion gears, which are retained by a carrier (corresponding to a third rotary element) 22. This carrier 22 is connected to the input shaft 11 of the transmission 10. Between the ring gear 21 and the output shaft 2 of the engine 1, there is arranged the input clutch Ci for connecting them selectively. Any two rotary elements (e.g., the sun gear 20 and the carrier 22) of the planetary gear mechanism 19 are connected to integrate the planetary gear mechanism 19 as a whole by the integration clutch Cd. Here, these clutches Ci and Cd are made of friction clutches to be applied by the oil pressure.

The engine 1 of FIG. 6 is equipped with an electronic throttle valve 23, the opening of which is to be electrically controlled. There is provided an electronic control unit (or an electric throttle ECU) 24 for controlling the electronic throttle valve 23. The electronic control unit 24 is constructed to receive an accelerator opening signal or a mode signal according to the opening of the (not-shown) accelerator pedal, for example, thereby to control the electronic throttle valve 23 with gains according to individual modes. With the motor/generator 3, moreover, there is connected an inverter 25 which is controlled by the MG-ECU7. Here, the remaining construction is similar to that shown in FIG. 1, and its description will be omitted from FIG. 6 by giving it the same reference numerals as those of FIG. 1.

FIG. 7 tabulates the running modes which can be set by the drive unit shown in FIG. 6. Here in FIG. 7, symbols ◯, X and Δ indicate the applied state, the released state and a control according to the situations, respectively. Here will be briefly described these individual running modes. In the motor running mode, the vehicle is driven to run only by the output of the motor/generator 3, and the input clutch Ci is released, partially applied or temporarily applied whereas the integration clutch Cd is applied. As a result, the planetary gear mechanism 19 is wholly integrated to couple the motor/generator 3 directly to the transmission 10 or the power transmission line so that the motor torque is inputted to the transmission 10.

In the engine running mode, the vehicle is driven to run by the output of the engine 1, or an electric power is generated, if necessary. In this mode, both the input clutch Ci and the integration clutch Cd are applied to connect the engine 1 to the ring gear 21 and to integrate the planetary gear mechanism 19 as a whole. As a result, the output torque of the engine 1 is transmitted to the integrated planetary gear mechanism 19 and further to the transmission 10. Since the motor/generator 3 is coupled to the integrated planetary gear mechanism 19, on the other hand, it can be rotated to generate the electric power by the engine 1. Alternatively, the torque, as outputted from the motor/generator 3, can be transmitted from the planetary gear mechanism 19 to the transmission 10 so that the output torque of the engine 1 and the output torque of the motor/generator 3 can be synthesized and outputted Here will be described the assist mode. Since the torque synthesizing/distributing mechanism 18 is constructed of the planetary gear mechanism 19, the output torque can be changed in various manners by the differential action of the planetary gear mechanism 19. In this assist mode, therefore, the integration clutch Cd is released so that the planetary gear mechanism 19 may perform the differential action, whereas the input clutch Ci is applied to connect the engine 1 to the ring gear 21. In this case, the carrier 22 connected to the transmission 10 acts as an output element, the ring gear 21 acts as an input element, and the sun gear 20 acts as a reaction element.

In this state, the carrier 22 is either brought into the stopped state or rotated at a lower speed than the ring gear 21, if the output torque of the engine 1 is transmitted to the ring gear 21 and the sun gear 20 is reversed together with the motor/generator 3. If the motor/generator 3 is reversed to bring the carrier 22 into the stopped state, more specifically, this stopped state can be kept. At the same time, the carrier 22 rotates in the same direction as that of the engine 1 at a gradually rising speed, if the speed of the motor/generator 3 and the speed of the sun gear 20 connected thereto in the backward direction are gradually reduced. As a result, the torque to be generated by the carrier 22 is either the sum of the output torque of the engine 1 and the reaction torque of the motor/generator 3 or the torque raised according to the gear ratio in the planetary gear mechanism 19, so that the engine torque is increased by the motor torque.

In the neutral mode, moreover, no torque is inputted to the transmission 10, so that both the input clutch Ci and the integration clutch Cd are released. In the planetary gear mechanism 19, therefore, the ring gear 21 rotates idly to release the torque so that the output torque of the engine 1 or the motor/generator 3 is not inputted to the transmission 10 even if the engine 1 or the motor/generator 3 rotates. In short, there is established a neutral state in which no driving torque is generated.

When the vehicle mounting thereon the parallel hybrid drive mechanism shown in FIG. 6 is started by depressing the accelerator pedal deeply or when an increase in the output torque is demanded by depressing the accelerator pedal deeply substantially simultaneously with the vehicle start, this start is made by the output of the motor/generator 3, but the engine 1 is quickly started in response to the torque increasing demand to increase the driving torque. An example for this control is shown in the flow chart of FIG. 8.

Figure 8:
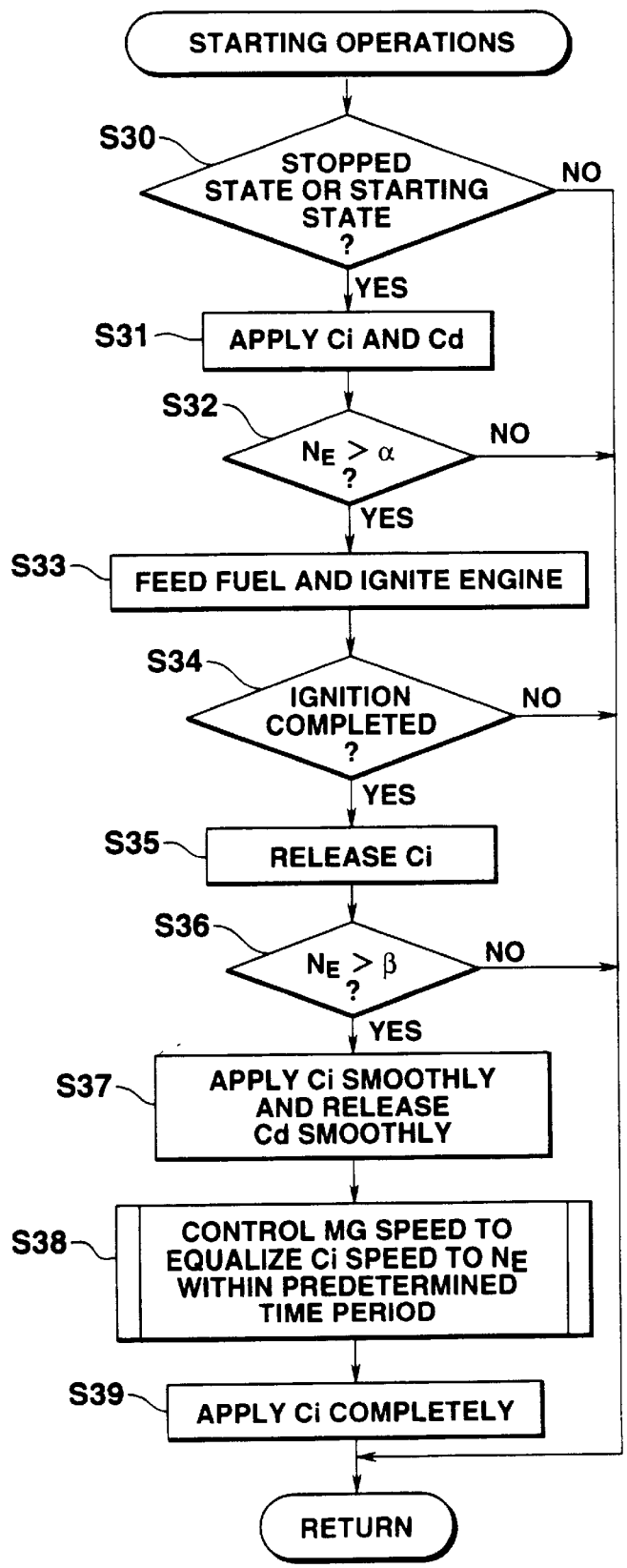
FIG. 8 is a flow chart for explaining one example of the engine start control routine after a motor starts, as executed in the drive control system of the invention for the drive mechanism shown in FIG. 6.

In the control example shown in FIG. 8, too, the engine 1 is also stopped at the vehicle starting time. Then, the stopped state or the starting state of the vehicle is decided (at Step S30). When the vehicle is in this stopped or starting state, both the input clutch Ci and the integration clutch Cd are applied (at Step S31). For starting the vehicle, more specifically, the engine 1 is connected to the planetary gear mechanism 19 which is integrated. Now, when the answer of Step S30 is NO because of neither the stopped state nor the starting state of the vehicle, the routine is skipped out without any control.

After the vehicle was started with the planetary gear mechanism 19 integrated and with the engine 1 connected to the planetary gear mechanism 19, it is decided (at Step S32) whether or not the engine speed NE is higher than a predetermined reference level α. While the vehicle is being started by the output of the motor/generator 3, more specifically, the engine 1 is coupled to a power transmission mechanism so that the engine 1 is dragged to rotate as the vehicle runs to have its speed NE gradually raised with the rise in the vehicle speed. Here in the construction shown in FIG. 6, the torque synthesizing/distributing mechanism 18, the transmission 10 and the drive mechanism connected to the output shaft 13 of the transmission 10 correspond to the aforementioned power transmission mechanism. The reference speed α at Step S32 is identical to that in the control example which has been described with reference to FIG. 3, as exemplified by 100 to 200 rpm. Thus, when the answer of Step S32 is NO because the engine speed NE is not sufficiently raised yet, the routine is skipped out. When the answer of Step S32 is YES, on the contrary, the engine 1 begins to be fed with the fuel and ignited (at Step S33).

Here, the feed of the fuel is effected by starting the control of a fuel injection, if the engine is of the fuel injection type, for example. It is then decided (at Step S34) whether or not the ignition in the engine 1 has been completed. The decision of this ignition completion is identical to that of Step S15 as shown in FIG. 3, and can be made in terms of the engine torque, the elapsed time period or the current value.

When the answer of Step S34 is NO, the routine is returned to continue the foregoing controls. When the ignition is completed to give Step S34 the answer YES, the input clutch Ci is released (at Step S35). Specifically, the engine 1 is uncoupled from the power transmission mechanism so that its output torque may not be inputted to the power transmission line. By performing this control of Step S35, the engine 1 is started at a low speed so that the fluctuation in the output torque will not appear as the driving torque even if the combustion or the output torque itself is unstable. This prevents the fluctuation in the driving torque at the initial stage of the engine start and the shock accompanying the torque fluctuation.

With the input clutch Ci being released at Step S35, only the integration clutch Cd is applied so that this running state is in the motor running mode, as tabulated in FIG. 7. In this state, it is decided (at Step S36) whether or not the engine speed NE is higher than a predetermined second reference level β. At this second reference speed β, the combustion of the engine 1 is stable, as exemplified by the level of the idle speed or a slightly lower speed. When the answer of Step S36 is NO, the routine is returned to keep the prevailing state. When the answer of Step S36 is YES, on the contrary, it is meant that the start of the engine 1 has been substantially completed, and the input clutch Ci is smoothly applied whereas the integration clutch Cd is smoothly released (at Step S37).

This control of Step S37 is to make a shift to the assist mode, as tabulated in FIG. 7, and the integration of the planetary gear mechanism 19 is gradually released to establish the differential action while applying the engine torque gradually to the ring gear 21. In this state, the speed of the motor/generator 3 is controlled to equalize the speed of the ring gear 21, i.e., the speed of the input clutch Ci to the engine speed NE (at Step S38). If the integration clutch Cd is gradually released while raising the torque transmission capacity of the input clutch Ci gradually, more specifically, the planetary gear mechanism 19 is disintegrated, and the torque from the engine 1 is transmitted to some extent to the ring gear 21 so that the planetary gear mechanism 19 performs the differential action. By controlling the speed of the motor/generator 3, i.e., the speed of the sun gear 20 with the carrier 22 being loaded by the transmission 10, therefore, the speed of the ring gear 21, i.e., the speed of the input clutch Ci is changed by the differential action of the planetary gear mechanism 19. As the torque transmission capacity of the input clutch Ci rises, therefore, the speed of the ring gear 21 quickly becomes equal to the engine speed NE. At the instant when the engine speed becomes equal to the speed of the input clutch Ci, i.e., the speed of the ring gear 21, moreover, the input clutch Ci is completely applied (at Step S39).

According to the controls shown in FIG. 8, therefore, simultaneously when the vehicle is started by the output of the motor/generator 3, the torque is applied to rotate the engine 1. At the instant when the engine speed NE reaches an ignitable level, the engine 1 is fed with the fuel and is ignited. As a result, the engine 1 can be substantially started in a low speed state of the vehicle or in a low speed state of the motor/generator 3. In an unstable state of the combustion of the engine 1, moreover, the engine 1 is uncoupled from the power transmission line so that the fluctuation in the engine torque will not appear as the driving torque. This makes it possible to prevent the shock and the deterioration in the riding comfort. When the engine 1 in the stable combustion state is to be coupled to the power transmission line, still moreover, the speed of the input clutch Ci is equalized within a short time period to the engine speed by the differential action of the planetary gear mechanism 19 constructing the torque synthesizing/distributing mechanism 18. As a result, it is possible to shorten the time period, for which the output torque of the engine 1 begins to be inputted to the power transmission line, and to avoid in advance the shock which might otherwise be caused by coupling the engine 1 to the power transmission line again.

By the control shown in FIG. 8, moreover, the driving force can be increased by making use of the engine torque just after the start of the vehicle, as in the aforementioned case of the control shown in FIG. 3, even when a high driving force is demanded just after the vehicle start as at the start on a steep uphill. Still moreover, the time period for the vehicle to run only with the motor/generator 3 can be shortened to prevent the excessive discharge of the battery in advance.

Figure 9:
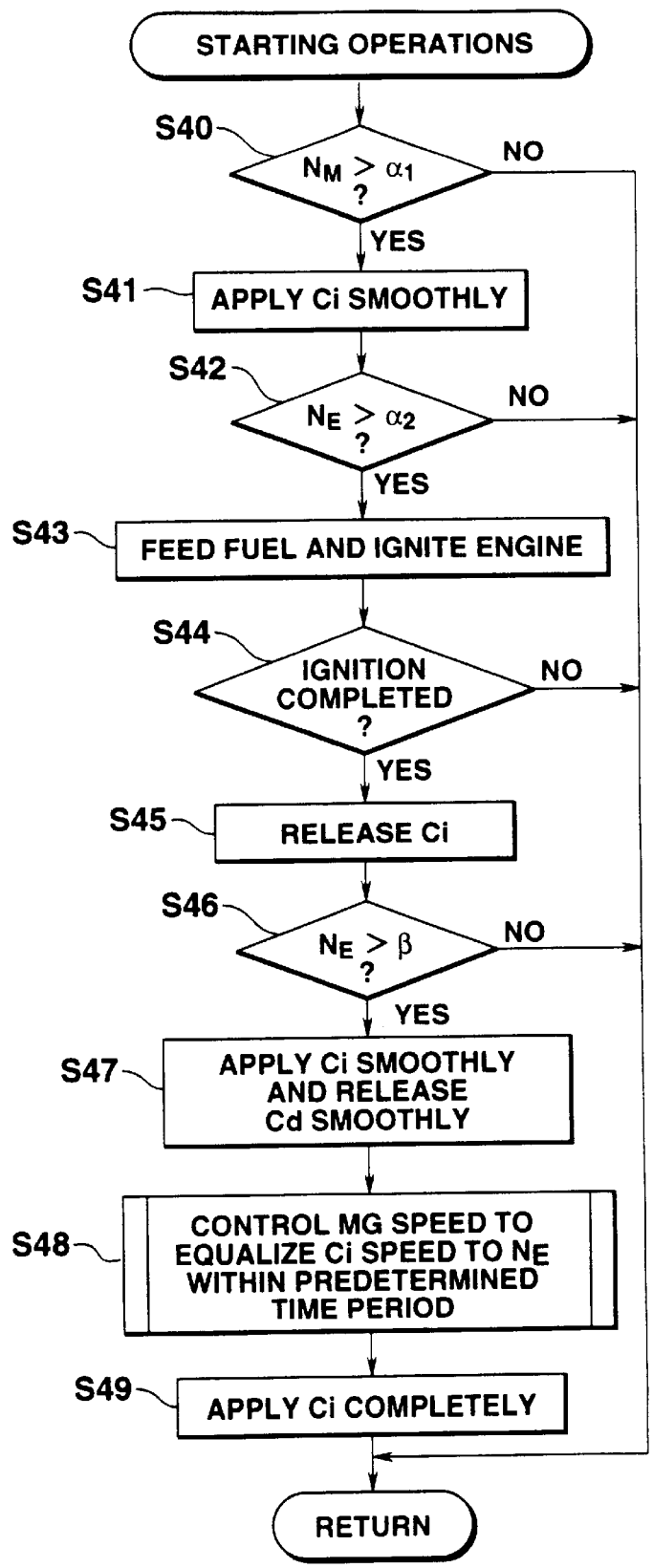
FIG. 9 is a flow chart for explaining another example of the engine start control routine after a motor starts, as executed in the drive control system of the invention for the drive mechanism shown in FIG. 6.

Here, even the hybrid vehicle, as equipped with the torque synthesizing/distributing mechanism of FIG. 6 in the power transmission mechanism, is enabled to improve the fuel economy by shortening the dragging time period of the engine 1 just after the vehicle start, as will be exemplified in FIG. 9.

In this control example shown in FIG. 9, as in the foregoing one shown in FIG. 4, the engine 1 in a stopped state is started, while being uncoupled from the power transmission line, by the motor torque, and is then coupled, when the motor speed rises to some extent, to the power transmission line so that it is rotated and started. By releasing the input clutch Ci and applying the integration clutch Cd, more specifically, the engine 1 in the stopped state is started, while being uncoupled from the power transmission line, by the motor/generator 3. It is then decided (at Step S40) whether or not the motor speed NM grows higher than the first reference level $\alpha 1$. This first reference speed $\alpha 1$ is equal to the aforementioned one at the Step S21 of FIG. 4, as exemplified by a level as low as about 100 rpm. When the answer of Step S40 is NO, the routine is returned to keep the prevailing state.

When the answer of Step S40 is YES, on the contrary, the input clutch Ci is smoothly applied (at Step S41). Specifically, the engine 1 having no feed of the fuel is coupled to the power transmission line, and the torque for rotating the engine 1 is gradually raised. This control makes it possible to prevent an abrupt fluctuation in the driving torque while the vehicle is being run by the output torque of the motor/generator 3, thereby to avoid the shock.

Since the speed of the engine 1 is thus gradually increased by dragging (freely rotating) the engine 1, it is decided (at Step S42) whether or not the engine speed NE is higher than the second reference level $\alpha 2$. This second reference speed $\alpha 2$ is equal to the aforementioned one of Step S23 in the control example, as has been described with reference to FIG. 4. The second reference level $\alpha 2$ is about at the minimum level to allow the combustion in the engine 1, as exemplified by 200 to 300 rpm. When the answer of Step S42 is NO, moreover, the routine is returned to continue the prevailing state. When the answer is YES, on the contrary, the routine advances to Step S43, at which the engine 1 is fed with the fuel and ignited.

From now on, the decision of the ignition completion (at Step S44), the release of the input clutch (at Step S45), the decision on whether or not the engine speed NE is higher than the reference level $\beta$ (at Step S46), the smooth application of the input clutch and the smooth release of the integration clutch (at Step S47), the control of the speed of the motor/generator 3 to equalize the speed of the input clutch Ci to the engine speed NE (at Step S48), and the complete application of the input clutch (at Step S49) are executed as in the controls of Step S34 to Step S39, respectively, as has been described with reference to FIG. 8.

In the control shown in FIG. 9, more specifically, the engine 1 is uncoupled from the power transmission line till the motor speed rises to some extent, so that the friction loss during the uncoupling can be avoided to improve the fuel economy advantageously. In the control shown in FIG. 9, too, the engine 1 can be substantially started even in a low speed state of the vehicle or the motor/generator 3, and the fluctuation in the driving torque in an unstable state of the speed just after the start of the engine 1 can be avoided. Since the engine 1 can be substantially started in the low vehicle speed state, moreover, the engine torque can be utilized, when its high level is demanded just after or at the start of the vehicle, as the driving torque so that a sufficient torque satisfying the torque increasing demand can be obtained to improve the accelerability. It is further possible to eliminate the delay in the response to the acceleration demand or the torque raising demand. Since the vehicle speed capable of using the engine torque as the driving torque can be made lower than that of the prior art, moreover, it is possible to avoid the situation in which the time period for the vehicle to be driven by the motor torque without raising the vehicle speed as at a start on a steep uphill might otherwise be elongated, thereby to prevent a situation for the battery to be excessively discharged, in advance.

Figure 10:
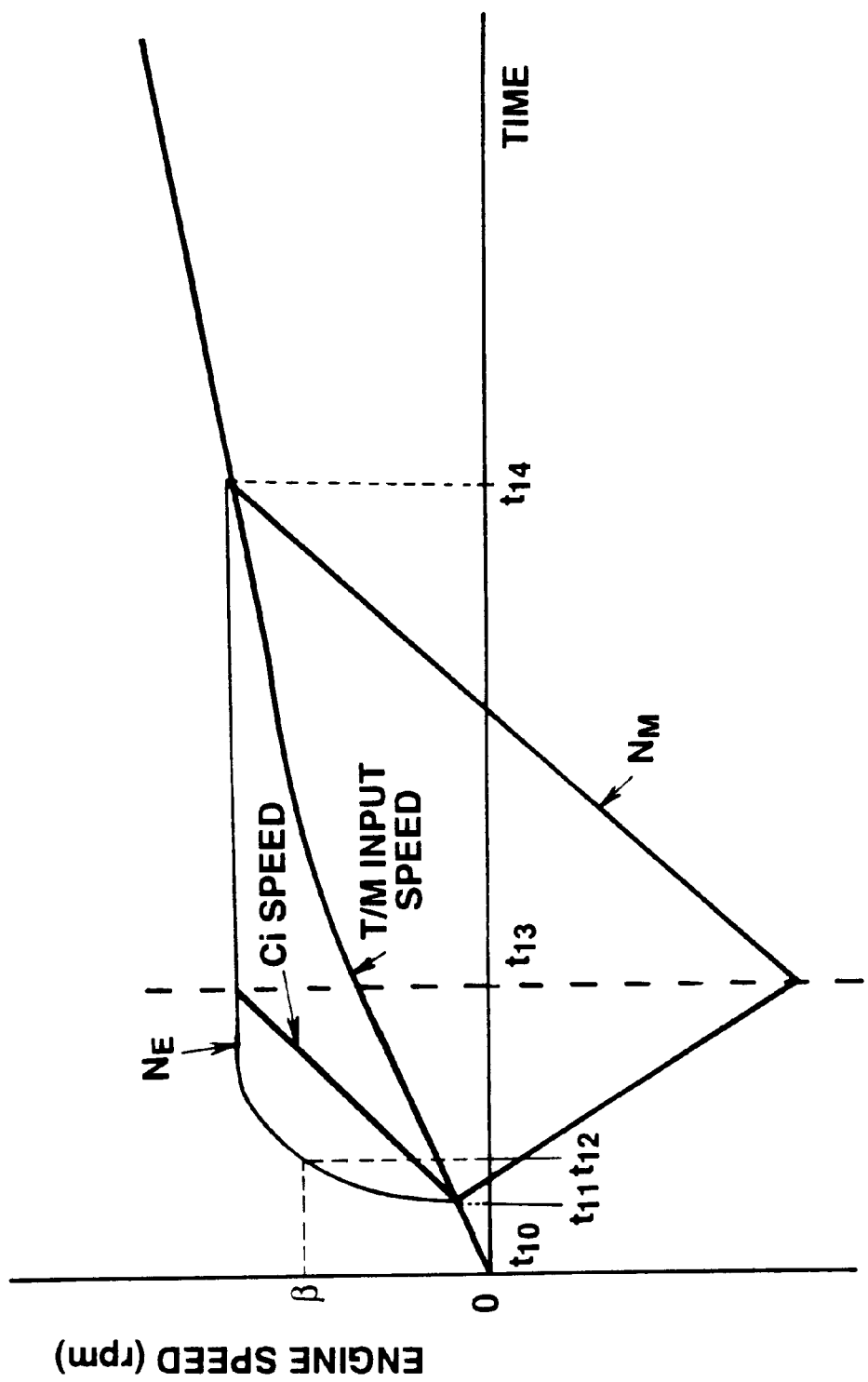
FIG. 10 is a time chart illustrating changes in the engine speed, the input speed of the transmission and the speed of a motor generator when the control of FIG. 8 or 9 is executed.

FIG. 10 is a diagram illustrating the changes in the speeds in the case of the control shown in FIG. 8 or 9. At a moment t11 after a predetermined time period from a vehicle starting moment t10, an engine ignition is performed. Substantially simultaneously with this, the engine ignition is completed so that the engine 1 is uncoupled from the power transmission line. As a result, when the engine speed NE rises to the aforementioned second reference level $\beta$ at a moment t12, the control to apply the input clutch Ci smoothly and to release the integration clutch Cd smoothly and the control of the speed of the motor/generator 3 are started to equalize the speed of the input clutch Ci to the engine speed NE. At a moment t13 when the speed of the input clutch Ci and the engine speed NE are synchronized, the input clutch Ci is completely applied. By raising the speed of the motor/generator 3 gradually, then, the output torque is raised by the assist of the motor/generator 3, until the speed of the motor/generator 3, i.e., the speed of the sun gear 20 becomes equal to the engine speed NE, i.e., the speed of the ring gear 21 so that the planetary gear mechanism 19 rotates substantially integrally as a whole. This integral rotation occurs at a moment t14 in FIG. 10. From now on, the vehicle is driven to run by the output of the engine 1.

The parallel hybrid vehicle is constructed, as described hereinbefore, such that an internal combustion engine, as shortly referred to as the engine, can be selectively coupled to the power transmission line, to which an electric motor such as the motor/generator is coupled, so that the engine can be started by rotating it with the motor torque. In this case, in the so-called "free-running state" wherein the engine is rotated with the motor torque while being stopped to have fuel feed, much power may be consumed by the friction in the engine and/or by the compression of the sucked air, to cause a deterioration in the entire fuel economy of the vehicle. In the drive control system according to the invention, therefore, the following control will be made to suppress as much as possible the power loss which might otherwise be caused by freely rotating (or dragging) the engine so as to start the engine.

Figure 11:
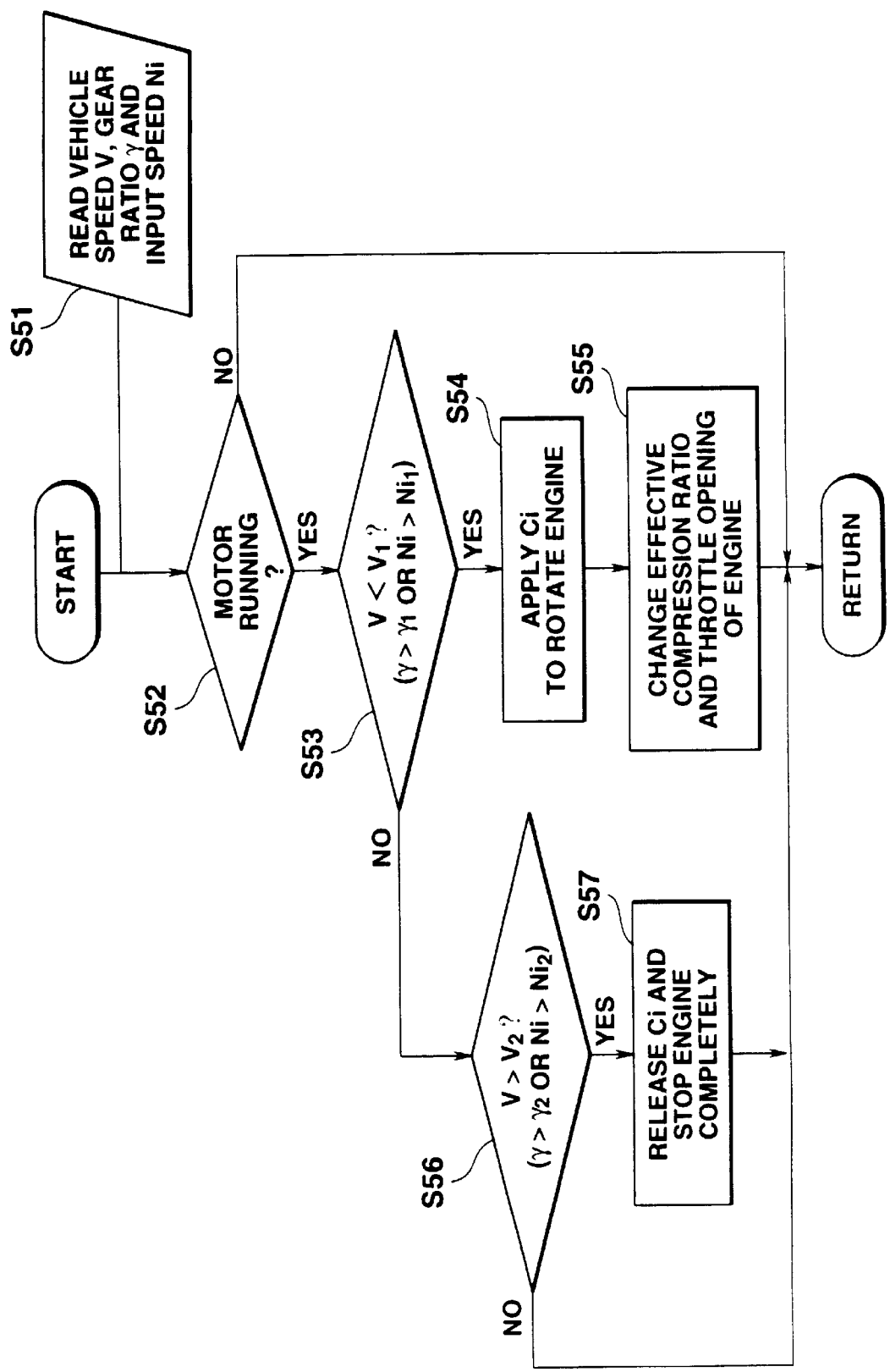
FIG. 11 is a flow chart showing a control routine for executing or not the so-called "free-running" of the engine in accordance with the running conditions.

FIG. 11 shows an example of the control. Data including a vehicle speed V, a gear ratio $\gamma$ and a speed Ni of the input to the transmission are read in advance (at Step S51). It is then decided (at Step S52) whether or not the vehicle is being driven to run by the motor, i.e., by the output of the motor/generator 3. When the answer of Step S52 is NO, it means that the vehicle is stopped or that the engine 1 has been already started, and the routine is skipped out without any control. When the answer of Step S52 is YES, on the contrary, it is decided (at Step S53) whether or not the vehicle speed V is lower than a predetermined reference level V1.

This reference vehicle speed V1 is not lower than the level, at which the engine 1 can be started and at which the rotation of the engine 1 in the stopped state of the fuel feed causes no disadvantage but is contained within an allowable range, and can be determined in advance. Moreover, another level could be adopted as the reference vehicle speed V1 in accordance with the vehicle state such as the engine water temperature.

When the answer of Step S53 is YES because the vehicle speed V is low, the engine 1 is coupled to the power transmission line to rotate the engine 1 (at Step S54). The control for coupling the engine 1 to the power transmission line is made by applying the input clutch 5 for the aforementioned hybrid vehicle shown in FIG. 1 and by applying the input clutch Ci for the drive mechanism shown in FIG. 6.

Figure 12:
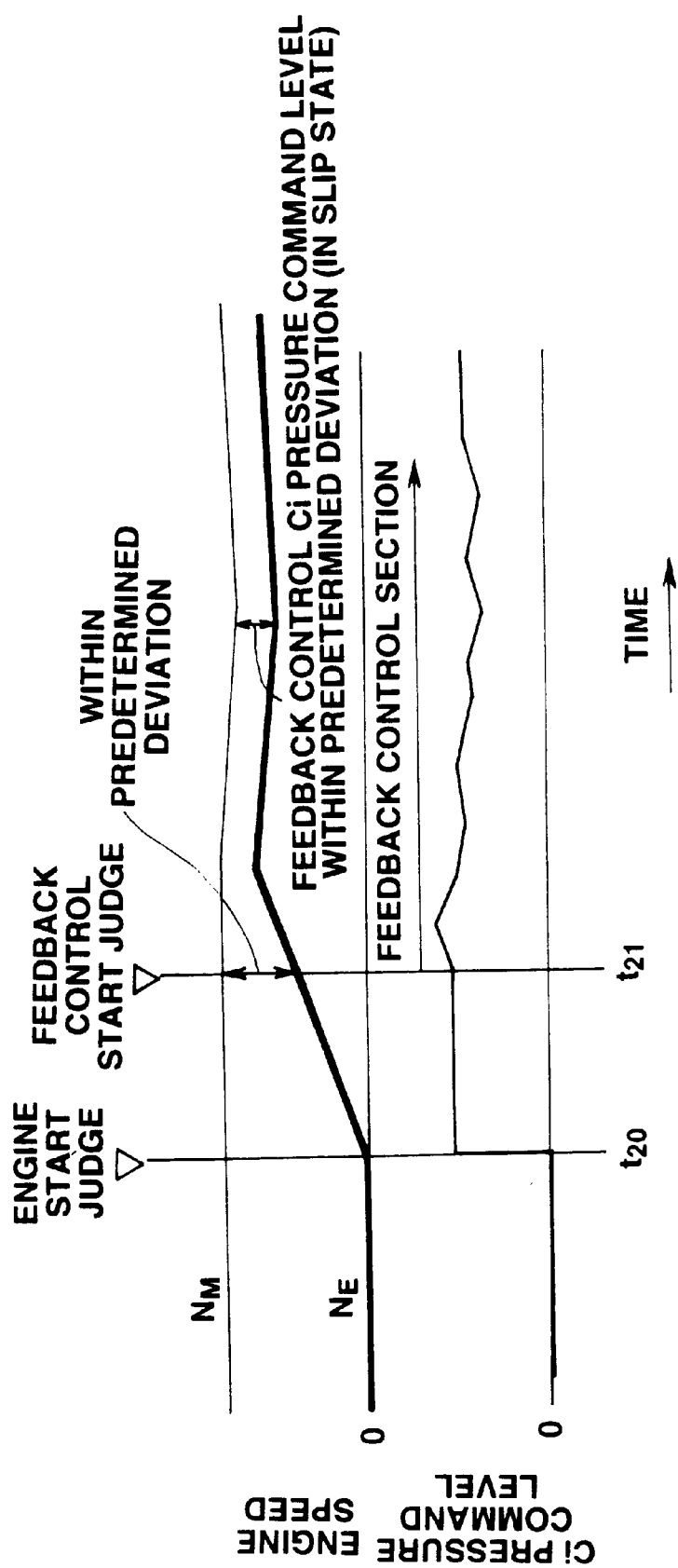
FIG. 12 is a time chart illustrating the case in which the engine speed is kept at a predetermined value by keeping the input clutch in a slip state by a feedback control.

When the engine 1 having no fuel feed is to be coupled to the power transmission line, the input clutches 5 and Ci are applied not completely but partially (in the slip state). This control example is illustrated as a time chart in FIG. 12. Specifically, the start of the engine 1 is judged when a demand for raising the driving force is made while the vehicle is being driven to run by the output of the motor/generator 3 and when the vehicle speed V at this moment is lower than the aforementioned reference level V1. At this moment t20, a command signal for applying the input clutch is outputted. The output is made, for example, by raising a duty signal or current value for the solenoid valve to determine the regulation level of the oil pressure of the input clutch.

After this, the feedback control of the input clutch is started at the moment t21 when the deviation between the engine speed NE and the motor speed NM (or the speed of the input to the transmission 10) becomes lower than a predetermined value. In other words, the indicated level of the input clutch oil pressure is subjected to a feedback control to set the deviation between the engine speed NE and the motor speed NM to a predetermined value. Here, the start of the feedback control is postponed to the moment t2 1, because the control value may highly possibly overshoot if the feedback control is executed simultaneously with the rotation of the engine 1.

By thus performing the feedback control of the input clutch, the input clutch is kept in the slip state to restrict the transmission of the torque between the engine 1 and the power transmission line. By thus controlling the input clutch, the engine 1 is not overrun so that the power loss, as might otherwise be caused by the forced rotation of the engine 1, can be suppressed. Moreover, the torque fluctuation, as accompanying the so-called "dragging" of the engine 1, is prevented from affecting the driving torque through the power transmission line thereby to avoid the deterioration of the riding comfort, as might otherwise be caused by the shock or vibration.

As described hereinbefore, the input clutches 5 and Ci can be exemplified by frictional clutches or especially by wet type frictional clutches, which may be lowered in their durabilities by the thermal load increasing with the continuation of the slip state even if they can be cooled down with oil. Therefore, a control shown in FIG. 13 may be preferably made together when the input clutches are subjected to the slip control for rotating the engine 1 freely, while the vehicle is being driven by the motor.

Figure 13:
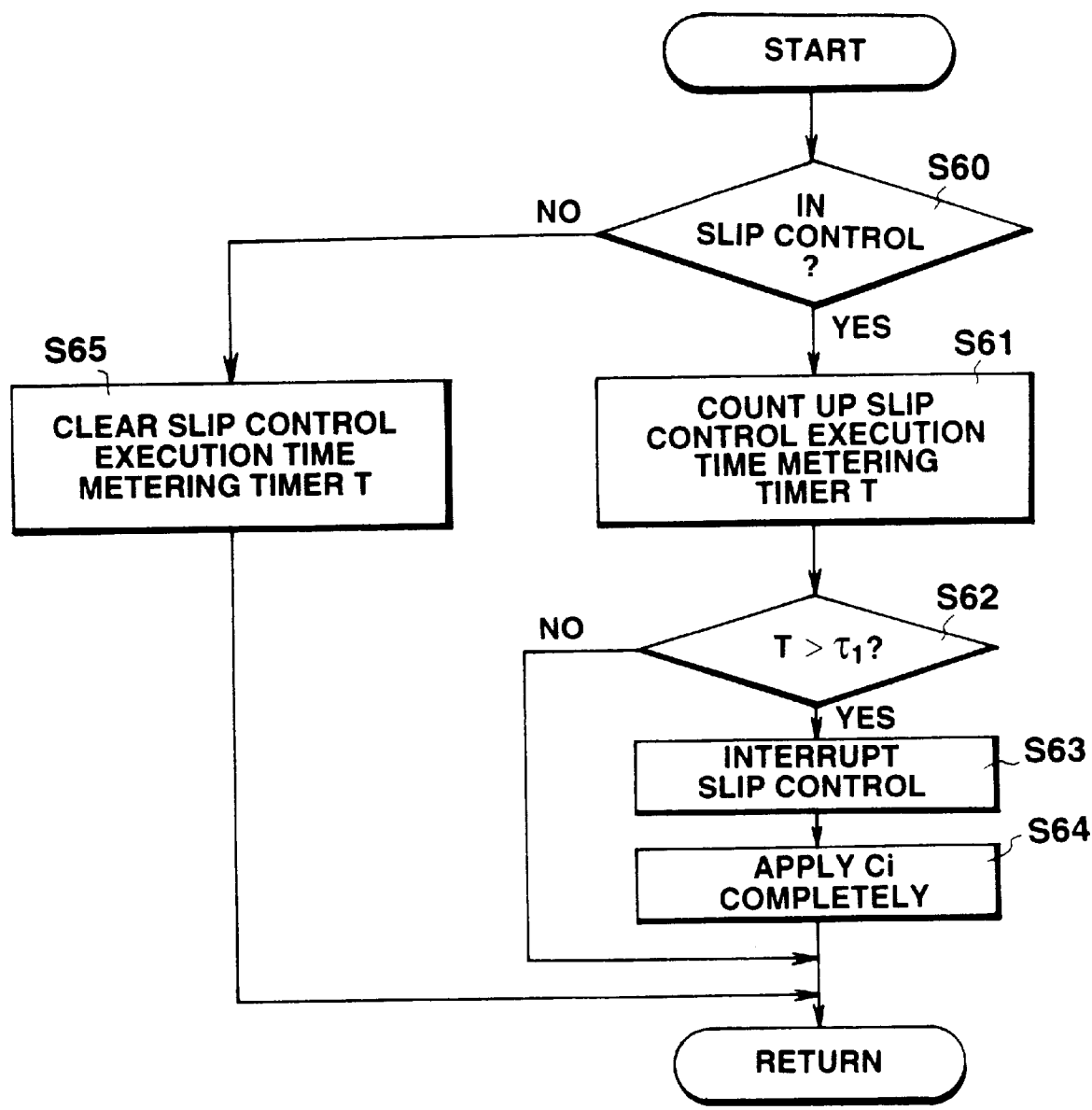
FIG. 13 is a flow chart showing a control routine for restricting a slip control of the input clutch.

FIG. 13 shows a control routine for restricting the slip state of the input clutch. First of all, it is decided (at Step S60) whether or not the input clutch is in the slip control. This decision can be made based on whether or not the control signal of the input clutch oil pressure is outputted. When the answer of Step S60 is YES, the execution time of the slip control is counted (at Step S61), and it is decided (at Step S62) whether or not the counted value T exceeds a predetermined reference value τ1. This reference time τ1 is a limit time for allowing the input clutch to be continuously kept in the slip state. When the answer of Step S62 is YES, therefore, it means that the slip control reaches its limit. Therefore, the slip control is interrupted (at Step S63), and the input clutch is completely applied (at Step S64). Specifically, the clutch oil pressure is boosted to the original pressure or the line pressure of the entire drive control system.

Here, when the answer of Step S62 is NO because the timer value T is not higher than the reference value τ1, the routine is returned to keep the prevailing state. When the answer of Step S60 is NO because no slip control is executed, the slip control execution time metering timer T is cleared (at Step S65), and the routine is returned. By thus controlling the slip state of the input clutch, it is possible to prevent an excessive slip of the input clutch and to avoid the degradation in the durability of the input clutch.

The control to apply the input clutch at Step S54, as shown in FIG. 11, is executed to rotate the engine 1 with the motor torque. In this case, a control to reduce the loss, as might otherwise accompany the so-called "free-running" of the engine 1, is executed in addition to the aforementioned slip control of the input clutch. As shown at Step S55 in FIG. 11, more specifically, the effective compression ratio and the throttle opening of the engine 1 are changed. Since the engine 1 under consideration is an internal combustion engine to be run in a cycle including the suction and compression strokes, the compression ratio of the sucked air is lowered to make the engine 1 rotate idly, with no fuel feed, by elongating the time period for which both the intake valve and the exhaust valve are opened. In order to reduce the pipe resistance to the intake air, moreover, the throttle opening is enlarged. Thus, it is possible to suppress the torque loss and fluctuation which will accompany the dragging of the engine 1 when the vehicle is driven to run by the motor.

When the accelerator pedal is again depressed deeply for demanding a rise in the driving torque, therefore, the engine 1 can be substantially started by returning the effective compression ratio of the engine 1 to an ordinary value, by setting the throttle opening to a value according to the depression stroke of the accelerator pedal and by feeding the engine with the fuel and igniting it. This makes it possible to eliminate the delay in the start of the engine 1 and in the control to increase the driving torque with the engine torque. Since the engine 1 has been already rotated, moreover, the fluctuation in the driving torque, as caused by starting the engine 1, can be reduced to prevent or suppress the shock.

When the answer of Step S53 is NO because the vehicle speed V exceeds the aforementioned reference level V1 while the vehicle is driven to run with the motor torque, it is decided (at Step S56) whether or not the vehicle speed V is higher than a second reference level V2. Here, this second reference vehicle speed V2 is higher than the reference vehicle speed V1 (V2>V1) at Step S53. The routine is returned to keep the prevailing state, when the answer of Step S56 is NO. When the answer is YES, on the contrary, the control to release the input clutch is executed, and the engine 1 is completely stopped (at Step S57). Specifically, the transmission of the torque to the engine 1 is completely shut, and the feed of the fuel to the engine 1 is stopped. In other words, the vehicle is driven to run by the motor, but the engine is not freely rotated.

Figure 14:
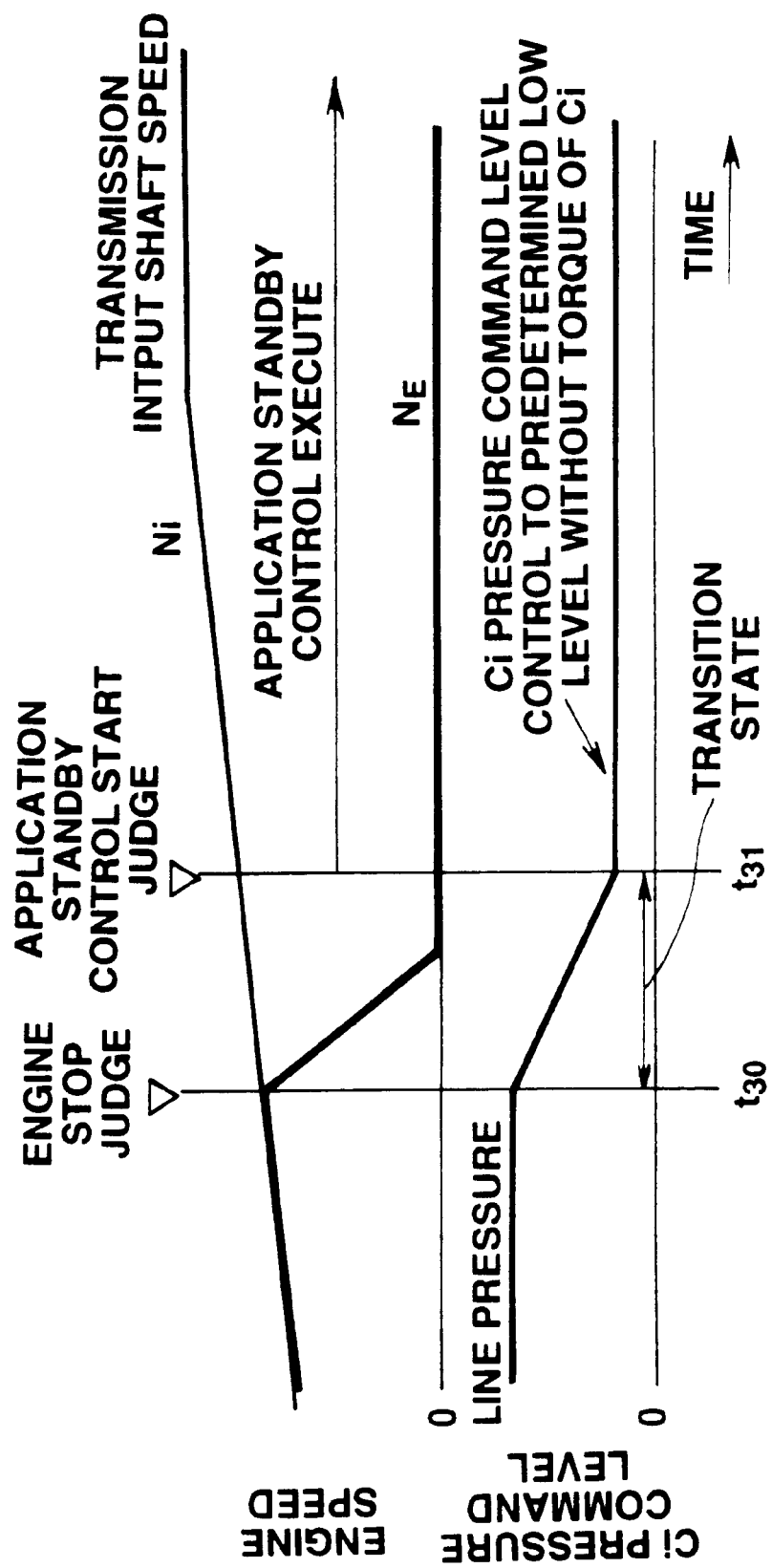
FIG. 14 is a time chart showing the case in which the so-called "standby control" of the input clutch is executed when an engine stopped.

In the control to release the input clutch, on the other hand, the oil pressure of the input clutch is not completely dropped to zero but is kept at a level for the so-called "standby state". This control will be described with reference to FIG. 14. At a moment t30 when the answer of Step S56 is YES, the indicated level of the input clutch oil pressure is gradually lowered to reduce the torque to be transmitted to the engine 1 thereby to lower the engine speed NE gradually. This control is made to prevent the shock which might otherwise be caused by an abrupt change in the speed. At a moment t31 just after the engine speed NE took the zero value, moreover, the control is made to keep the clutch oil pressure at that time.

This is the standby state, in which a low oil pressure is applied to the input clutch but the input clutch per se has no torque transmission capacity. In other words, the clearance between the friction discs of the input clutch and the clearance between the hydraulic piston and the friction disc are so narrowed that these components are in contact with each other to transmit no torque. When a rise in the torque is demanded by depressing again the accelerator pedal deeply, therefore, the engine can be quickly rotated and started by raising the oil pressure of the input clutch. Thus, the delay in the start of the engine 1 can be prevented. In this case, moreover, the engine 1 is rotated from its stopped state, but the fluctuation in the driving torque is relatively reduced to deteriorate no shock because the vehicle speed V is higher than the aforementioned reference level V2.

Here, in the control example shown in FIG. 11, the decision on whether or not the control to rotate the engine 1 freely is made on the basis of the vehicle speed V. This is partly because the fluctuation in the driving torque relatively increases to deteriorate the shock if the free-running of the engine 1 is started in a low vehicle speed state, and partly because the power loss increases if the engine 1 is freely rotated in a high vehicle speed state. If these disadvantages can be eliminated, therefore, the decision on whether or not to execute the free-running of the engine 1 may be made in terms of a parameter other than the vehicle speed. For the conditions for rotating the engine 1 freely, more specifically, the vehicle speed V may be replaced by the gear ratio γ or the input speed Ni of the transmission 10 so that whether or not the free-running of the engine 1 in the case where the vehicle is driven by the motor is to be executed may be decided on the basis of the results of the comparisons between those data and reference levels γ1, γ2, Ni1 and N12 which are set corresponding to them. In this case, as at Step S53 and Step S56, a hysteresis may be preferably set for the deciding reference levels thereby to prevent the hunting at the time of applying/releasing the input clutch. In the case of the control based on the gear ratio γ, the engine 1 is coupled to the power transmission line by applying the input clutch so that it may be rotated, if the gear ratio γ is higher than the reference value γ1. Thus, the engine 1 can be started without newly rotating it, thereby to prevent the shock. When the gear ratio γ is lower than the other reference level γ2, on the contrary, the input clutch is released to uncouple the engine 1 from the power transmission line. Then, even if the torque fluctuates when the engine 1 is newly rotated, it will not seriously appear as the fluctuation in the driving torque because of a low gear ratio, thereby to invite no deterioration in the shock.

Figure 15:
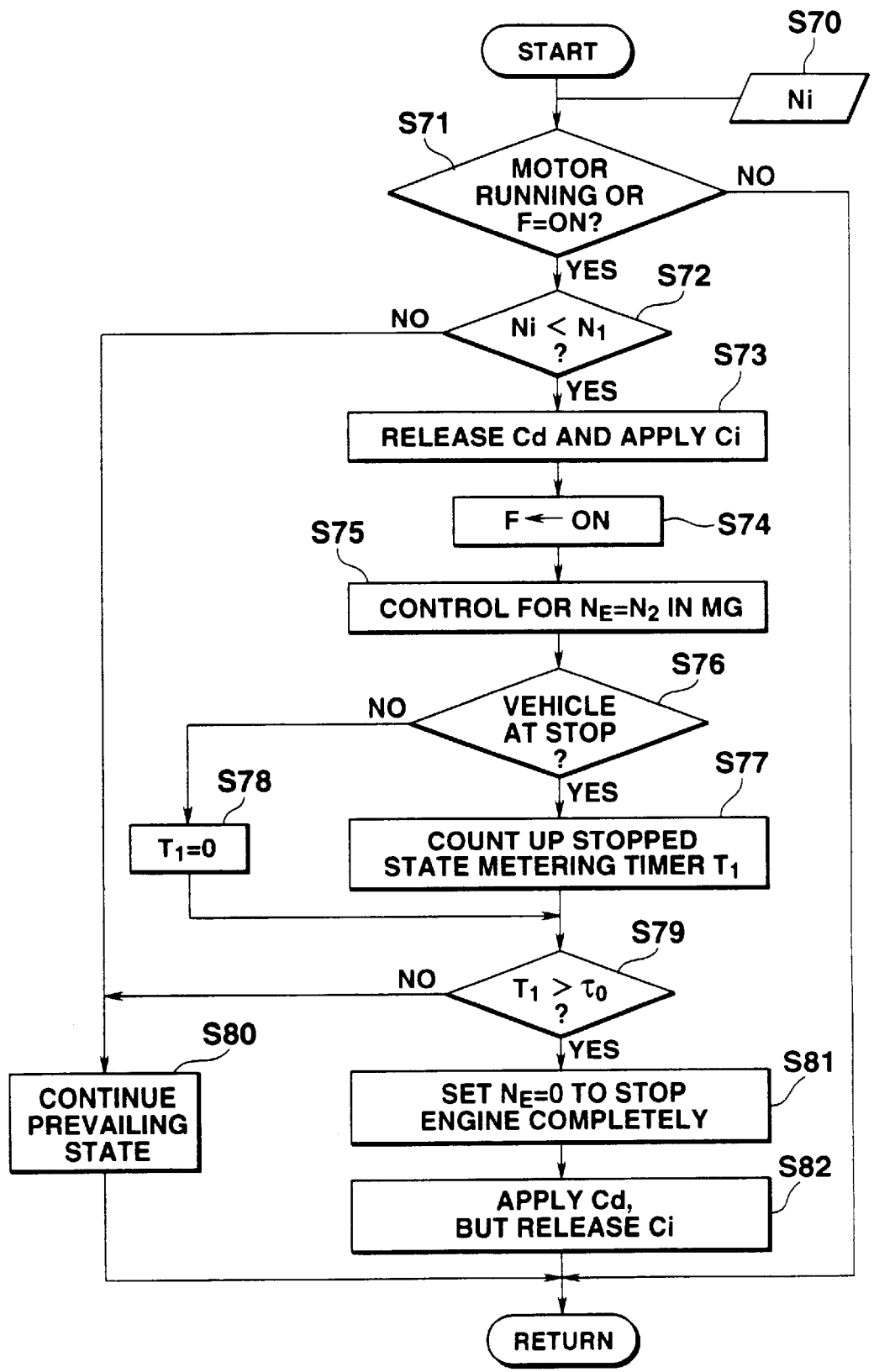
FIG. 15 is a flow chart for explaining one example of the engine stop control when the vehicle is stopped.

In the control thus far described, the engine 1 is rotated with the motor torque at a low vehicle speed time. This is because the engine 1 is instantly started to raise the driving force when a torque for the acceleration from the low vehicle speed is demanded. When the low vehicle speed state including the vehicle stop continues for a long time, however, the power may be wastefully consumed. FIG. 15 shows a control example for eliminating this disadvantage.

This control example shown in FIG. 15 is executed for the hybrid vehicle which includes the torque synthesizing/distributing mechanism 18 of FIG. 6 in the power transmission line. First of all, necessary data such as the input speed Ni of the transmission 10 are read in (at Step S70). It is then decided (at Step S71) whether or not the vehicle is driven to run by the motor, or whether or not a control execution flag F is ON. When the answer of Step S71 is NO, this routine is skipped out because the control to start/stop the engine 1 is not required. When the answer of Step S71 is YES, on the contrary, it is decided (at Step S72) whether or not the input speed Ni of the transmission 10 is lower than a predetermined first reference level Ni. In the construction of FIG. 6, the motor speed may be decided at Step S72, because the integration clutch Cd is applied when the vehicle runs with the motor so that the input speed Ni of the transmission 10 is equal to the motor speed.

When the answer of Step S72 is YES because the input speed Ni of the transmission 10 is lower than the reference level N1, the integration clutch Cd is released, but the input clutch Ci is applied (at Step S73). This is the assist mode, as shown in FIG. 7. Simultaneously with this, the control execution flag F is turned ON (at Step S74). As described hereinbefore, the assist mode utilizes the differential action of the planetary gear mechanism 19 so that the speed NE of the engine 1 and the input speed Ni of the transmission 10 can be controlled with the motor speed (i.e., the speed of the motor/generator 3). At Step S75, therefore, the motor/generator 3 is controlled to equalize the engine speed NE to a predetermined second reference level N2. Here, this second reference speed N2 is lower than the aforementioned first reference speed N1 and takes about the minimum speed allowing the engine 1 to be started.

It is then decided (at Step S76) whether or not the vehicle is stopped. This decision can be based on the vehicle speed or the output speed of the transmission 10. When the answer of Step S76 is YES because the vehicle is stopped, the stopped state continuation time period is counted (at Step S77) by a timer T1. Here, when the answer of Step S76 is NO because the vehicle is running, the timer T1 is set to zero (at Step S78). It is decided (at Step S79) whether or not the counted value T1 exceeds a predetermined reference value τ0. This reference time period τ0 can be arbitrarily set, in short, as a standby time period till the start of a next control.

When the answer of Step S79 is NO, therefore, the prevailing state is kept (at Step S80). In this case, more specifically, the engine speed NE is kept at a predetermined level by the motor/generator 3. When the answer of Step S79 is YES, on the contrary, the engine 1 is stopped (at Step S81) by reducing the speed of the motor/generator 3 to zero. Moreover, a next start by the motor/generator 3 is prepared by applying the integration clutch Cd and by releasing the input clutch Ci, and the control execution flag F is turned OFF (at Step S82). Here, when the aforementioned answer of Step S72 is NO, the routine advances to Step S80, at which the prevailing state is kept.

FIG. 16 illustrates a time chart of the case in which the aforementioned control is executed while the vehicle is driven to run by the engine 1. Till the input speed Ni of the transmission 10 goes down to a level lower than the first reference speed N1, the oil pressures of the individual clutches Ci and Cd are kept at a pressure corresponding to the line pressure so that the vehicle is in the engine running mode tabulated in FIG. 7. Then, the integration clutch Cd is released at a moment t40 when the input speed Ni of the transmission 10 goes down below the first reference speed N1.

As a result, the engine running mode is changed to the assist mode in which the vehicle speed lowers as the vehicle is braked, so that the input speed of the transmission 10 lowers accordingly. On the other hand, the speed of the motor/generator 3 is controlled in the backward direction. As a result, the engine speed NE is kept at the second reference level N2. A nomographic diagram as to the planetary gear mechanism 19 in this state is also illustrated in FIG. 16. At and after a moment t41 when the vehicle stop is decided, the engine speed NE is kept at the second reference level N2. At a moment t42 when the continuation moment T1 reaches the reference level τ0, the speed of the motor/generator 3 is set to zero so that the engine 1 is stopped. Then, the motor running mode shown in FIG. 7 is established by applying the integration clutch Cd but by releasing the input clutch Ci.

In the control shown in FIG. 15, therefore, when the vehicle stops, the engine 1 is not instantly stopped but is kept at a start allowing speed by making effective use of the function of the torque synthesizing/distributing mechanism 18. When an acceleration is demanded by depressing the accelerator pedal deeply from the stopped state, therefore, the engine 1 is quickly started because it has been already rotated, so that the acceleration demand can be satisfied without any delay in the control.

Here, the foregoing individual embodiments according to the invention are exemplified by the construction in which the motor/generator 3 is coupled to the front stage side of the transmission 10, i.e., to the engine 1. However, the drive control system to be covered by the invention should not be limited to the foregoing construction shown in FIG. 1 or 6 but can be applied to a hybrid drive unit in which an electric motor such as a motor/generator is connected to the output side of the transmission. The invention can also be applied to a drive control system for a hybrid vehicle which is equipped with a mechanism for rotating an internal combustion engine by a starter motor.

The correlations between the invention and the foregoing embodiments will be summarized in the following. Specifically, the motor/generator 3 corresponds to the electric motor of the invention, and the engine 1 corresponds to the internal combustion engine. Moreover, the rotary shaft 4 of the motor/generator 3, the transmission 10, and the members composing the torque transmission line from the transmission to the drive wheels 16 correspond to the power transmission line of the invention, and the clutches 5 and Ci correspond to the clutch mechanism of the invention.

Moreover, the motoring means in the invention corresponds to the functions of the foregoing Steps S12, S22, S31, S41, S54, S57 and S73. The motoring speed control means of the invention corresponds to the function of Step S54. The speed detecting means of the invention corresponds to the functions of Steps S13, S23, S32 and S42. The ignition means of the invention corresponds to the functions of Steps S14, S24, S34 and S43. The release means of the invention corresponds to the functions of Steps S16, S26, S37 and S47. Moreover, the functions of these Steps S16 and S26 and the foregoing Steps S38 and S48 correspond to the application control means, the feedback control means or the speed calculate means of the invention.

The re-application control means of the invention corresponds to the aforementioned functions of Steps S38 and S48. The stop detect means of the invention corresponds to the function of Step S76. The speed keep control means of the invention corresponds to the functions of Steps S79 and S80. The functions of Steps S77 and S79 correspond to the stop continuation detect means of the invention, and the function of Step S81 corresponds to the stop control means of the invention.

Here will be synthetically described the advantages to be achieved by the invention. According to the invention, the internal combustion engine is dragged while the vehicle is driven to run by the output of the electric motor. When the internal combustion engine has to be started in response to a demand for raising the driving force or for generating the electric power, therefore, it can be instantly started by feeding it with the fuel so that a delay in the response to such demand can be avoided.

While the vehicle is driven to run by the output of the electric motor, on the other hand, the internal combustion engine is rotated by coupling it to the power transmission line only either when the vehicle speed or the input speed of the transmission is low or when the gear ratio is high. By starting the feed of the fuel to the internal combustion engine while the vehicle is running with the electric motor, the internal combustion engine can be started so that the shock to be caused by the start of the internal combustion engine can be easily reduced. Since the speed of the internal combustion engine having no feed of the fuel is low, moreover, the power loss can be suppressed to improve the fuel economy. In the running state contrary to this, that is, while the vehicle is running with the output of the electric motor and when the vehicle speed or the input speed of the transmission is high or when the gear ratio is low, the internal combustion engine is uncoupled from the power transmission line and is stopped so that the power loss, as might otherwise accompany the rotation of the internal combustion engine, will not occur. Even when the internal combustion engine is rotated to be started, moreover, the change in the driving torque can be reduced to prevent the deterioration in the shock.

According to the invention, the speed of the internal combustion engine having no feed of the fuel can be restricted to a low level so that the power loss due to the friction in the internal combustion engine or the compression of the air can be suppressed. Since the speed of the internal combustion engine is restricted by restricting the torque transmission capacity of the clutch mechanism, moreover, the torque fluctuation accompanying the rotation of the internal combustion engine can be suppressed from appearing in the driving torque thereby to prevent the deterioration in the riding comfort.

Since the internal combustion engine is rotated by the torque of the electric motor from the start by the output of the electric motor, it can be started by feeding it with the fuel even when the speed of the electric motor or the vehicle is low. If the combustion in the internal combustion engine is continuous, on the other hand, the internal combustion engine is uncoupled from the power transmission line. As a result, even if the combustion or the output torque is unstable because the speed of the internal combustion engine is low, it is possible to prevent the fluctuation in the driving torque, the shock or the vibration.

Moreover, the time period for the internal combustion engine to be rotated by the output of the electric motor is as short as that for the speed of the internal combustion engine to come closer to the speed for starting the combustion therein, so that the power loss, as accompanying the rotation of the internal combustion engine having no feed of the fuel, can be suppressed.

Since the internal combustion engine is started at a low speed of the vehicle or the electric motor and is uncoupled from the power transmission line after the start, it can be easily started at the low speed of the vehicle or the electric motor, and the fluctuation in the output torque of the internal combustion engine in the case where the engine is started at the low speed does not appear in the driving torque so that the deterioration in the riding comfort can be prevented.

Since the released clutch mechanism is applied again to equalize the speed of the internal combustion engine to the predetermined level, the speeds of the electric motor and the internal combustion engine are synchronized at the time point when the clutch mechanism is applied, so that the run of the vehicle can be changed from that by the electric motor to either that by the internal combustion engine or that by the electric motor and the internal combustion engine.

By rotating the torque synthesizing/distributing mechanism integrally and by coupling it to the internal combustion engine, this engine is rotated by the output of the electric motor when the vehicle is started by the same output. As a result, the internal combustion engine can be started at a low vehicle speed or at its low speed, The internal combustion engine is uncoupled, after started at this low vehicle speed or at its low speed, so that the fluctuation in the output torque of the engine can be prevented from appearing in the driving torque.

After the vehicle was started by the output of the electric motor, the internal combustion engine is rotated each time it is coupled to the torque synthesizing/distributing mechanism rotating integrally, so that the engine can be started at the low vehicle speed or at its low speed. After the engine was thus started at the low vehicle speed or at its low speed, the fluctuation in the output torque of the engine can be prevented from appearing in the driving torque by uncoupling the engine.

Since the internal combustion engine which has completed its start is coupled to the torque synthesizing/ distributing mechanism to perform the differential action, the vehicle can be driven to run by the torque outputted from the engine and by the torque of the electric motor, or the vehicle can be driven by the amplified torque of the engine by applying the reaction torque from the electric motor.

Since the internal combustion engine is coupled to the torque synthesizing/distributing mechanism while its speed being controlled and since the electric motor is controlled to bring the speed of the second rotary element, i.e., the speed of the clutch mechanism closer to that of the internal combustion engine, the speed of the engine and the speed of the second rotary element can be synthesized to bring the clutch mechanism into the completely applied state.

When the vehicle speed goes down below the reference level, the internal combustion engine is rotated by the output torque of the electric motor without being fed with the fuel. By controlling the speed of the electric motor, moreover, the speed of the internal combustion engine is kept at the predetermined level. If an acceleration is demanded again when the vehicle is stopped or substantially stopped, therefore, the internal combustion engine can be quickly started by feeding it with the fuel so that a driving force necessary and sufficient for the acceleration can be generated.

For an acceleration after a temporary stop or after the vehicle speed is decelerated to a level near the stop, moreover, a driving force necessary for the acceleration can be generated by starting the internal combustion engine for a short time period. When the vehicle is to be stopped for a long time, on the contrary, it is possible to prevent the power loss which might otherwise be caused by rotating the internal combustion engine unnecessarily.

What is claimed is:

1. A drive control system for a hybrid vehicle in which an internal combustion engine is selectively coupled through a clutch mechanism to a power transmission line coupled to an electric motor, comprising:

motoring means for controlling said clutch mechanism in an applied state to couple said internal combustion engine to said power transmission line at one of time when a vehicle speed reached a predetermined reference level and when a speed of said electric motor reached a predetermined reference level after said hybrid vehicle had been started by the output of said electric motor;

speed detecting means for detecting that a speed of said internal combustion engine has reached a predetermined reference level;

ignition means for starting the combustion of a fuel in said internal combustion engine when it is detected by said speed detecting means that the speed of said internal combustion engine has reached said reference level; and release means for releasing the coupling between said internal combustion engine and said power transmission line by said clutch mechanism after the combustion of the fuel in said internal combustion engine continuously started.

2. A drive control system for a hybrid vehicle according to claim 1, further comprising:

application control means for applying said released clutch mechanism again so that the speed of said internal combustion engine may take a predetermined level.

3. A drive control system for a hybrid vehicle according to claim 2, wherein said application control means includes feedback control means for feedback-controlling the applied state of said clutch mechanism on the basis of the speed of said internal combustion engine.

4. A drive control system for a hybrid vehicle according to claim 2, further comprising:

speed calculating means for calculating the speed of said started internal combustion engine on the basis of a throttle opening or an accelerator opening, wherein said application control means includes feedback control means for feedback-controlling the torque transmission capacity of said clutch mechanism on the basis of the speed of said internal combustion engine so that the speed of said internal combustion engine may take the value calculated by said speed calculating means.

* * * * *